US010969507B2

(12) United States Patent
Morton et al.

(10) Patent No.: US 10,969,507 B2
(45) Date of Patent: Apr. 6, 2021

(54) SEISMIC CHANNEL GEOBODY EXTRACTION FOR BASIN FAIRWAY SIMULATION

(71) Applicant: Saudi Arabian Oil Company, Dhahran (SA)

(72) Inventors: Andrew Mark Morton, Dhahran (SA); Roger R. Sung, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 281 days.

(21) Appl. No.: 16/170,841

(22) Filed: Oct. 25, 2018

(65) Prior Publication Data

US 2020/0132870 A1 Apr. 30, 2020

(51) Int. Cl.
*G01V 1/28* (2006.01)
*G01V 1/30* (2006.01)

(52) U.S. Cl.
CPC ............... *G01V 1/307* (2013.01); *G01V 1/302* (2013.01); *G01V 1/308* (2013.01); *G01V 1/28* (2013.01); *G01V 2210/643* (2013.01)

(58) Field of Classification Search
CPC ........ G01V 1/308; G01V 1/307; G01V 1/302; G01V 1/345; G01V 1/46; G01V 2210/64;
(Continued)

(56) References Cited

U.S. PATENT DOCUMENTS 4,742,305 A 5/1988 Stolarczyk
5,844,799 A 12/1998 Joseph et al.
(Continued)

FOREIGN PATENT DOCUMENTS

CA 3036911 5/2018

OTHER PUBLICATIONS

Whitehead et al., "Interpretation driven salt scenario modelling with examples from the Dutch offshore and West Africa," SEG Technical Program Annual Meeting, New Orleans, Louisiana, 2015, pp. 5270-5275, 5 pages.
(Continued)

*Primary Examiner* — Gregory J Toatley, Jr.
*Assistant Examiner* — Lynda Dinh
(74) *Attorney, Agent, or Firm* — Fish & Richardson P.C.

(57) ABSTRACT

Methods, systems, and apparatus, including computer programs encoded on a computer storage medium, to identify geobodies for exploration and production activities. In one aspect, a method includes receiving seismic volume data regarding a geobody, generating an interpretation object by applying a multi-Z interpretation at representative intervals of edge-detected attributes through the seismic volume data, converting Z-value surfaces to points at each of the representative intervals, the Z-value surfaces generated by gridding polygons having been infilled and converted from the interpretation object, applying a mathematical addition or subtraction to generate a body of points representing the geobody by replicating the points at successive intervals, forming a blended 3D property model of the geobody by combining the seismic volume data resampled into a three-dimensional (3D) cellular grid, and enabling exploration activities by employing the seismic attribute analysis of the geobody identified based on the blended 3D property model.

20 Claims, 23 Drawing Sheets

(58) Field of Classification Search
CPC ...... G01V 2210/643; G01V 1/28; G06T 7/13; G06T 7/55; G06T 15/08
See application file for complete search history.

(56) References Cited

U.S. PATENT DOCUMENTS

| | | | |
|---|---|---|---|
| 7,054,749 B1 | 5/2006 | O'Meara | |
| 7,340,385 B2 | 3/2008 | James | |
| 7,523,024 B2 | 4/2009 | Endres et al. | |
| 9,229,129 B2 | 1/2016 | Wu | |
| 9,279,905 B2 | 3/2016 | Ronot et al. | |
| 9,824,135 B2 | 11/2017 | Imhof et al. | |
| 2010/0161232 A1* | 6/2010 | Chen | G01V 1/302 702/16 |
| 2010/0274543 A1* | 10/2010 | Walker | G01V 99/00 703/6 |
| 2011/0048731 A1* | 3/2011 | Imhof | G01V 1/302 166/369 |
| 2011/0264430 A1 | 10/2011 | Tapscott et al. | |
| 2012/0090834 A1* | 4/2012 | Imhof | G01V 1/307 166/250.01 |
| 2012/0197532 A1* | 8/2012 | Posamentier | G01V 1/345 702/14 |
| 2014/0114632 A1 | 4/2014 | Wu et al. | |
| 2014/0140580 A1* | 5/2014 | Neave | G01V 1/345 382/109 |
| 2014/0188392 A1* | 7/2014 | Aarre | G01V 1/301 702/14 |
| 2015/0030209 A1* | 1/2015 | Bounaim | G01V 1/301 382/109 |
| 2015/0066460 A1 | 3/2015 | Klinger et al. | |
| 2015/0369935 A1 | 12/2015 | Goggin et al. | |
| 2016/0104317 A1 | 4/2016 | Salman | |
| 2017/0219733 A1* | 8/2017 | Morton | G06T 15/00 |

OTHER PUBLICATIONS

PCT International Search Report and Written Opinion in International Appin. No. PCT/US2019/057562, dated Jan. 30, 2020, 16 pages.

* cited by examiner

SEISMIC CHANNEL GEOBODY EXTRACTION FOR BASIN FAIRWAY SIMULATION

TECHNICAL FIELD

This disclosure relates to methods, systems, and apparatus for improving the exploration for hydrocarbons.

BACKGROUND

A channel belts is a zone along a river valley where an active meandering channel will tend to be found. The channel freely meanders within this zone through time. Long periods of river flow result in a complex spatial distribution of partly preserved point bars, channel mud fills, and the predominantly muddy sediments of the floodplain. Over time, a channel belt can be buried under sediment. Such a structure is advantageous to the formation (e.g., filled with oil or gas) of hydrocarbon (fluvial) reservoirs. In such fluvial reservoirs, the point bars provide storage capacity for the oil or gas. The formation of these fluvial reservoirs within the channel belt form what is known as a fluvial channel system.

SUMMARY

The present disclosure describes methods and systems, including computer-implemented methods, computer-program products, and computer systems, to identify geobodies for exploration and production activities.

In a general implementation, system data is received from a data repository. The system data includes an abnormality. The system data having been collected from a plurality of systems deployed to service an operational facility. The abnormality is identified based on defined data quality measurements. The abnormality is assigned to a category based on key performance indicators (KPIs) and the defined data quality measurements. A resolution is determined to prevent the abnormality from occurring in subsequent system data based on the category assigned to the abnormality. The resolution is implemented in the systems deployed to service an operational facility.

In a general implementation, seismic volume data regarding a geobody is received. An interpretation object is generated by applying a multi-Z interpretation at representative intervals of edge-detected attributes through the seismic volume data. Z-value surfaces are converted to points at each of the representative intervals. The Z-value surfaces are generated by gridding polygons having been infilled and converted from the interpretation object. A mathematical addition or subtraction is applied to generate a body of points representing the geobody by replicating the points at successive intervals. A blended 3D property model of the geobody is formed by combining the seismic volume data resampled into a three-dimensional (3D) cellular grid and the body of points representing the geobody upscaled into the 3D cellular grid. Exploration activities are enabled by employing the seismic attribute analysis of the geobody identified based on the blended 3D property model.

Implementations include processes to enable effective interpretation of complex channel data that adds significant value to the exploration and production process. In some implementations, the described geobody-interpretation system does not depend on any specific software and can be applied using industry recognized seismic exploration applications with appropriate input data. The quality of the results from the described geobody-interpretation system can be determined by an initial multi-z interpretation, which forms the framework from which the final output is generated. The described geobody-interpretation system is significantly faster, more accurate, and practical than other techniques typically used for the same purpose. These features translate into tangible operational, commercial, and cost saving benefits.

The details of one or more implementations of the subject matter of this specification are set forth in the accompanying drawings and the later description. Other features, aspects, and advantages of the subject matter will become apparent from the description, the drawings, and the claims.

DETAILED DESCRIPTION

Figure 1A:
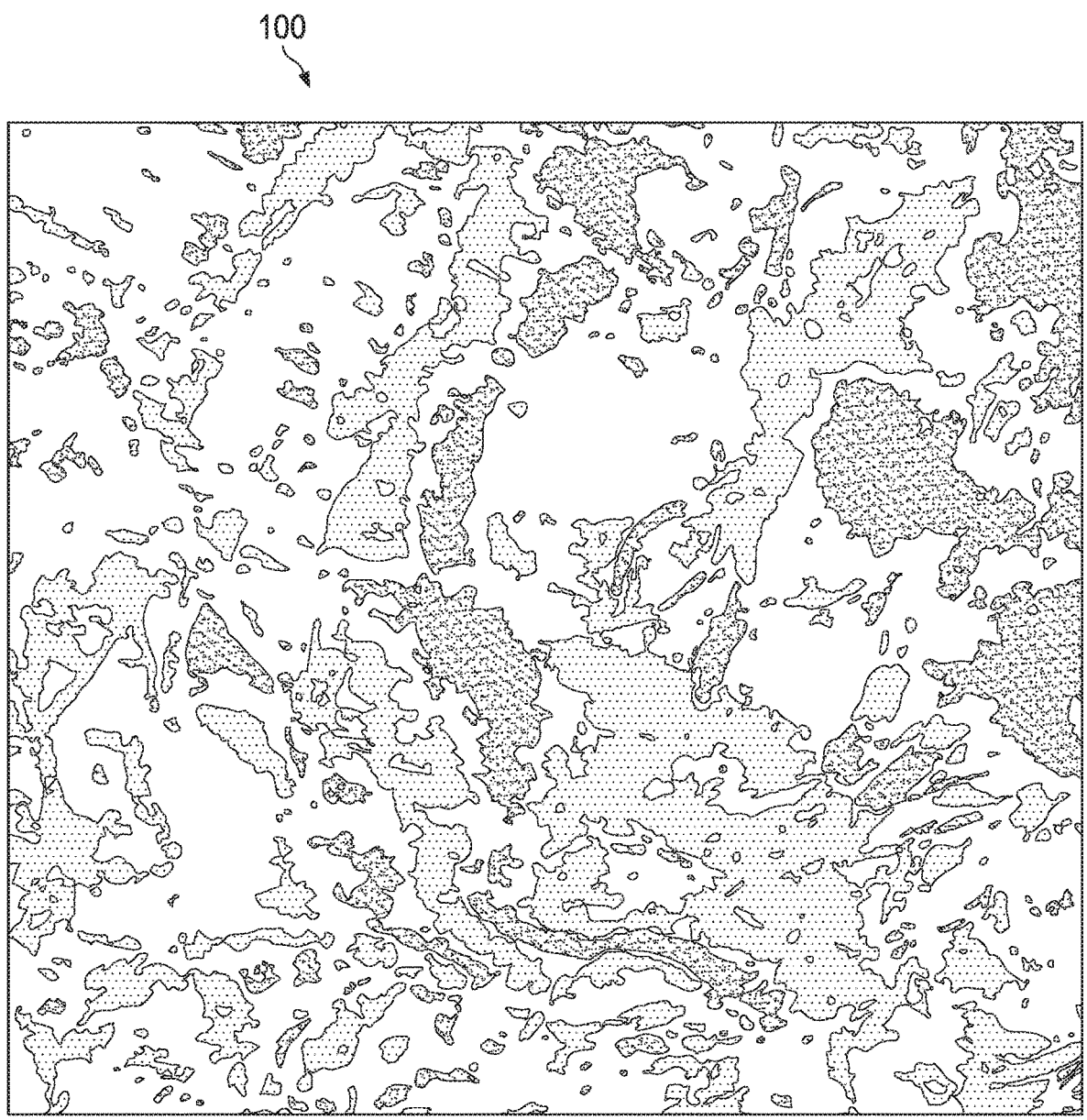
FIGS. 1A-1C depict example 3D seismic data on a time-slice that may be employed according to implementations of this disclosure.

This disclosure generally describes a geobody-interpretation system employed to identify geobodies, such as fluvial reservoirs data in, for example, the exploration and production of hydrocarbons. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

There are two primary depositional types associated with fluvial channel systems: braided-river and meandering-river deposits. A combination of both types may also exist in some environments. Braided-river deposits tend to be laterally continuous, relatively coarse-grained, and include gravel and sand, with little or no mud. Braided-river deposits form potentially high-porosity reservoirs. Conversely, meandering-river deposits are characterized by a meandering geometry that includes finer grained sediments and may, depending on post-depositional factors, such as compaction and cementation, display more variable porosity. Moreover, the geometry and scale of such systems can vary considerably, and in many cases is extremely complex. This complexity poses a challenge to interpreting the fluvial channel systems using, for example, three-dimensional 3D seismic data to delineate the system's three-dimensional geometry. Such a delineation the system's three-dimensional geometry may be employed for, for example, play fairway mapping and prospecting purposes.

Traditional techniques to interpret the complex systems of fluvial reservoirs are often impractical due to their inherently manual and time consuming nature. The output results of such techniques are also often in a form that is not easily employed as the input for other exploration and development activities. In addition, even without time constraints, the final interpretation is likely to be in an unsatisfactory form due to inherent limitations in the interpretation results format. For example, a commonly accepted approach is to apply geobody extraction techniques directly to 3D seismic data or derived attributes thereof that highlight the geobody. However, for this approach to be successful, the seismic characteristics of the channel systems must be sufficiently unique to those of the surrounding rock to enable them to be isolated and extracted. Unfortunately, even in cases where such systems are clearly visible, it may not be possible to easily extract them as an interpreted geobody because, for example, the acoustic characteristics of the fluvial system and surrounding geology are too similar.

In view of the forgoing, the described geobody-interpretation system derives data from 3D seismic attributes to more accurately represent the geometrical complexity of a geobody, such as fluvial channel systems. The output of the described geobody-interpretation system can be readily provided to other exploration and production processes and is an order of magnitude faster than traditional techniques. The described geobody-interpretation system combines the various techniques of seismic attribute analysis to identify and visualize geobodies, with advanced multi-Z interpretation and object manipulation to interpret the channel geometry in a form that can be employed in other exploration and production activities.

In some implementations, the interpreted geobodies are assigned a distinct property value that is upscaled into a 3D cellular model of the resampled original seismic volume of data or a 3D seismic data set. In some implementations, a 3D seismic data set is a cube or volume of data whereas a two dimensional (2D) seismic data set is a panel of data. The generated 3D cellular model may be converted back to a standard seismic format as a single seismic volume that includes, for example, fluvial channel systems, with unique values and in a form that can be isolated using, for example, geobody extraction techniques. The final result is an accurately defined 3D channel geobody that can be used for well planning and property modeling as well as a wide range of other exploration and development activities.

The importance of not only visualizing, but also accurately interpreting the 3D representation of complex channel systems is paramount. Such an interpretation can provide for more successful exploration and production outcomes. As an example, horizontal wells often require accurate spatial guidance in order to efficiently track and drain geometrically complex hydrocarbon-bearing zones within a reservoir. This can be done when the target channel reservoir is accurately interpreted and delineated. Similarly, the likelihood of success during exploration drilling increases if the target reservoir is effectively interpreted and delineated.

Further uses of the interpreted output of the described geobody-interpretation system include employing the body, either in its extracted geobody form or 3D cellular model form, to guide facies and property modeling activities. In a larger geological context, such results also contribute to better understanding of the effectiveness of a carrier system in play fairway mapping and the gross depositional environment. Similarly, the described geobody-interpretation system's output can play a part in common risk segment mapping in high risk exploration regimes. Moreover, seismic interpretation output provided by the described geobody-interpretation system can readily be used alongside well and core data to more fully understand the inter-well geology and stratigraphic framework.

Figure 1B:
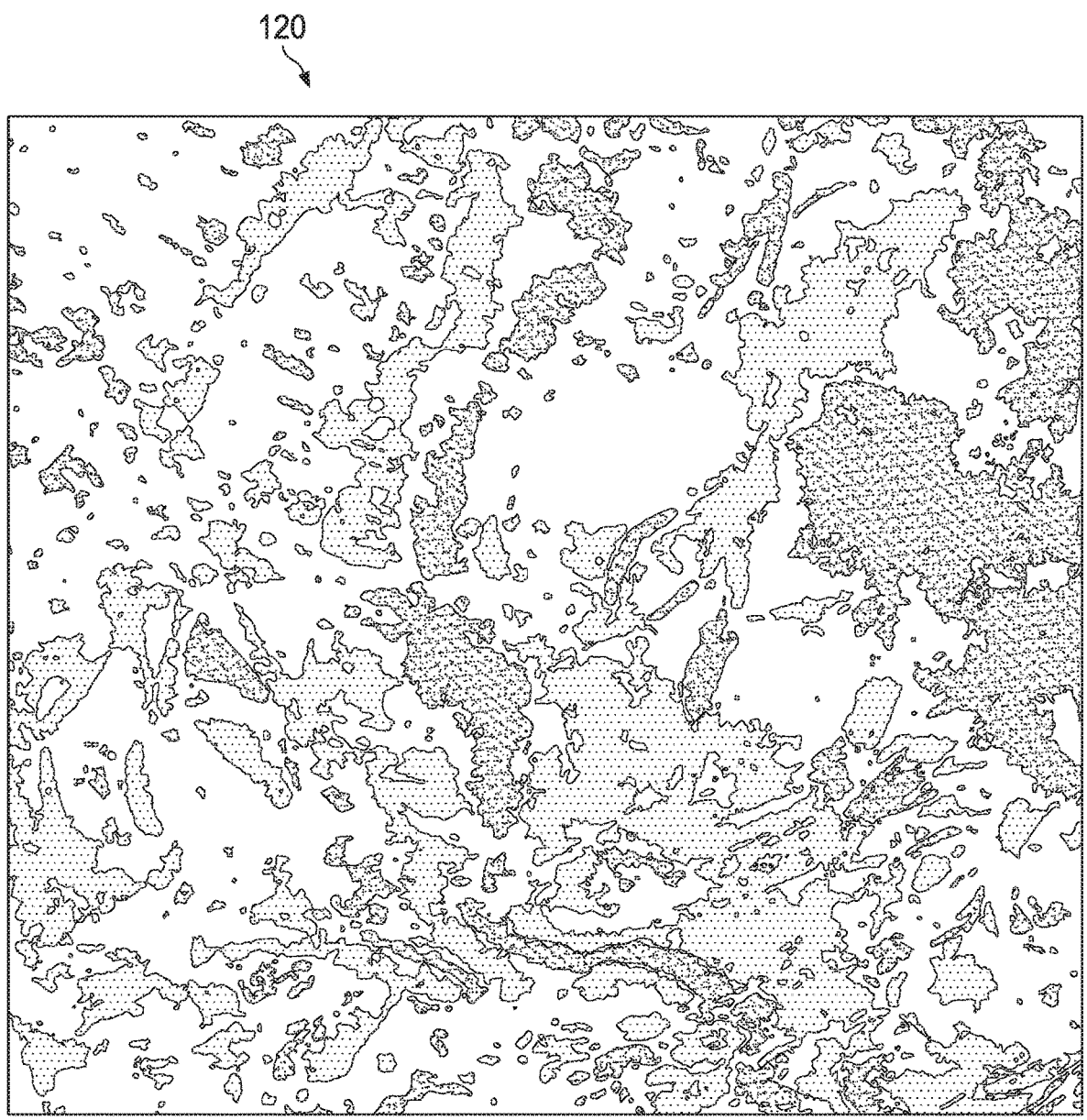
Figure 1C:
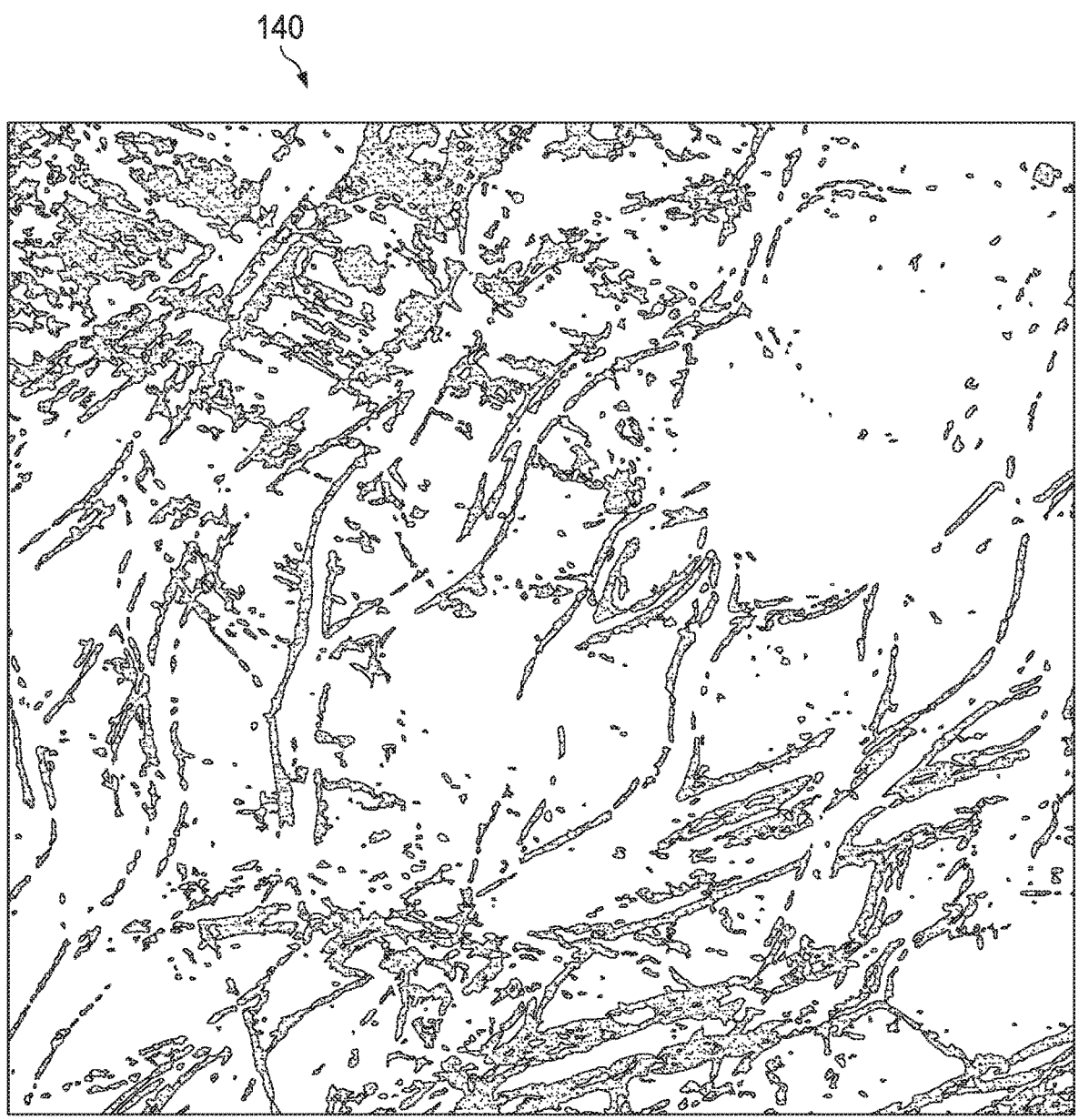

FIGS. 1A-1C depict example 3D seismic data 100, 120, and 140 respectively on a time-slice at 1148 millisecond (ms). The depicted examples show the existence of fluvial channel systems from enhanced seismic attributes. FIG. 1A depicts original seismic data 100 with the original amplitude before further processing is applied. FIG. 1B depicts the structural smoothed seismic data 120, which is the result of a local average sum applied to give a smooth look to the seismic structure. FIG. 1C depicts the edge-enhanced seismic data 140, which is the result of a discontinuity enhancement technique applied to highlight, for example, a fault line.

As described above, the example 3D seismic data depicted in FIGS. 1A-1C may typically be employed to interpret the respective fluvial channel systems by applying geobody extraction techniques. Such techniques may not always work if the seismic characteristics of the channel systems are insufficiently different to those of the surrounding rock.

The described geobody-interpretation system interprets such seismic data by employing multi-Z interpretation, where a single 'event' or 'horizon' can have more than one Z-value at the same XY location. The ability to quickly interpret a polygon outline on successive time-slices as a single entity enables rapid definition of the outline of the channels at successive intervals through the 3D seismic volume. For example, the 3D seismic data can include a 3D array of numbers where the X and Y axes are surface locations in the X and Y directions respectively (also as Inline and Crossline numbers in seismic survey terms). There is also a third dimension, Z, as different times (e.g., 0.1 seconds, 0.2 seconds, and so forth) going deeper into the earth structure. For example, a total from 0 to 4.0 seconds sampled at 4 ms intervals. In such examples, a time slice is a horizontal cut of the 3D seismic cube (e.g., like a horizontal slice cut from a 3D cake). The time slice shows different views through the cube (earth), which are possibly insightful. For example, a 3D vanilla cake with chocolate filling. If I am only interested in the chocolate filling (that say resides at between 2.6 seconds and 3.1 seconds only) a vertical cut of the cake will show mostly flour and lines of chocolate filling at between 2.6 and 3.1 seconds. However, if a time slice of the cake or horizontal is cut, then a time slice at 2.8 seconds will show a large areal range display of the chocolate filling, while a time slice at 0.9 seconds will show no chocolate filling at all. The described system is interested in the areal distribution of the fluvial channels, which can be visualized at successive time slices.

Figure 2A:
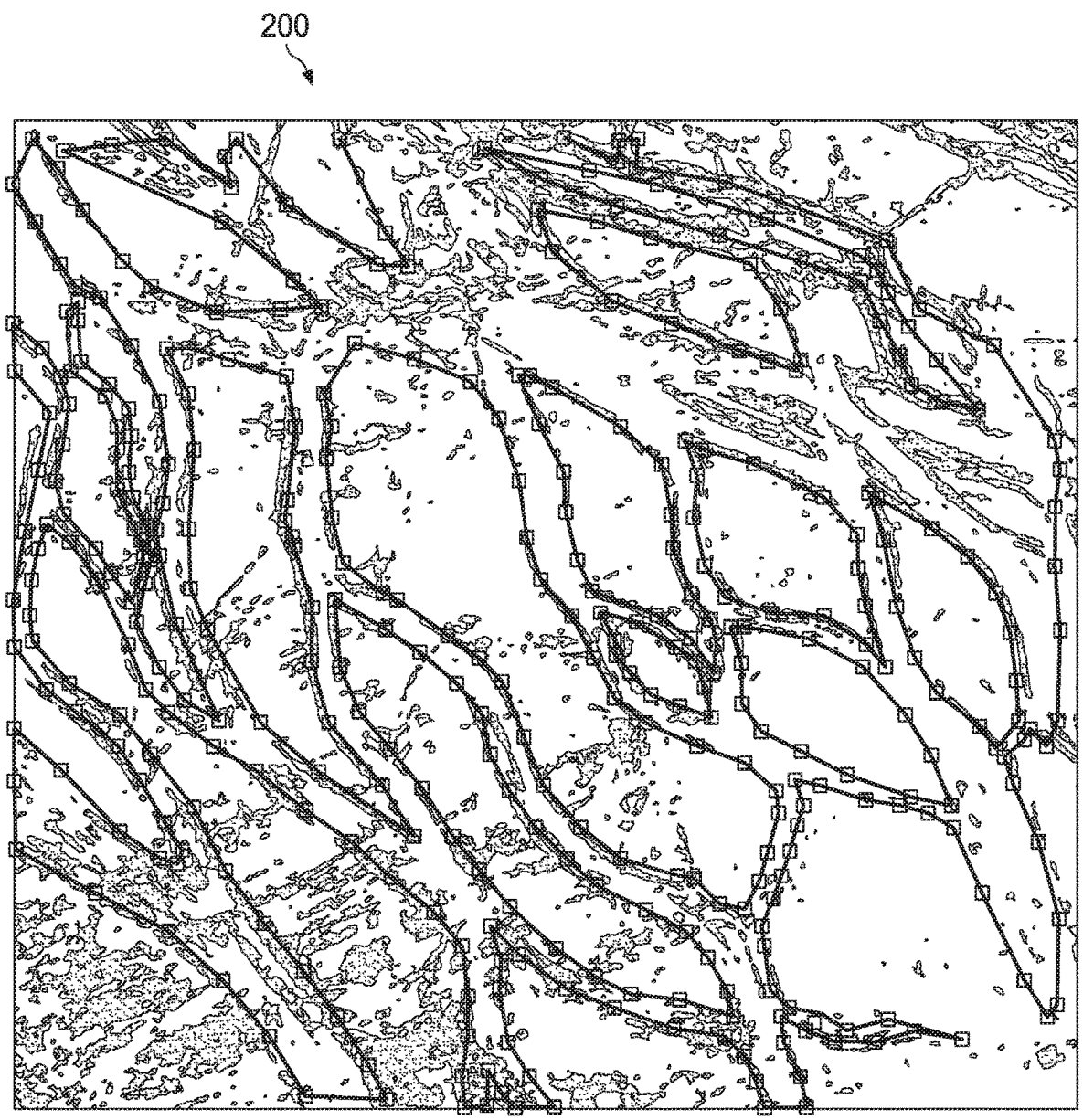
FIG. 2A-2B depict example multi-Z interpretations of fluvial channels on successive 3D time-slices.
Figure 2B:
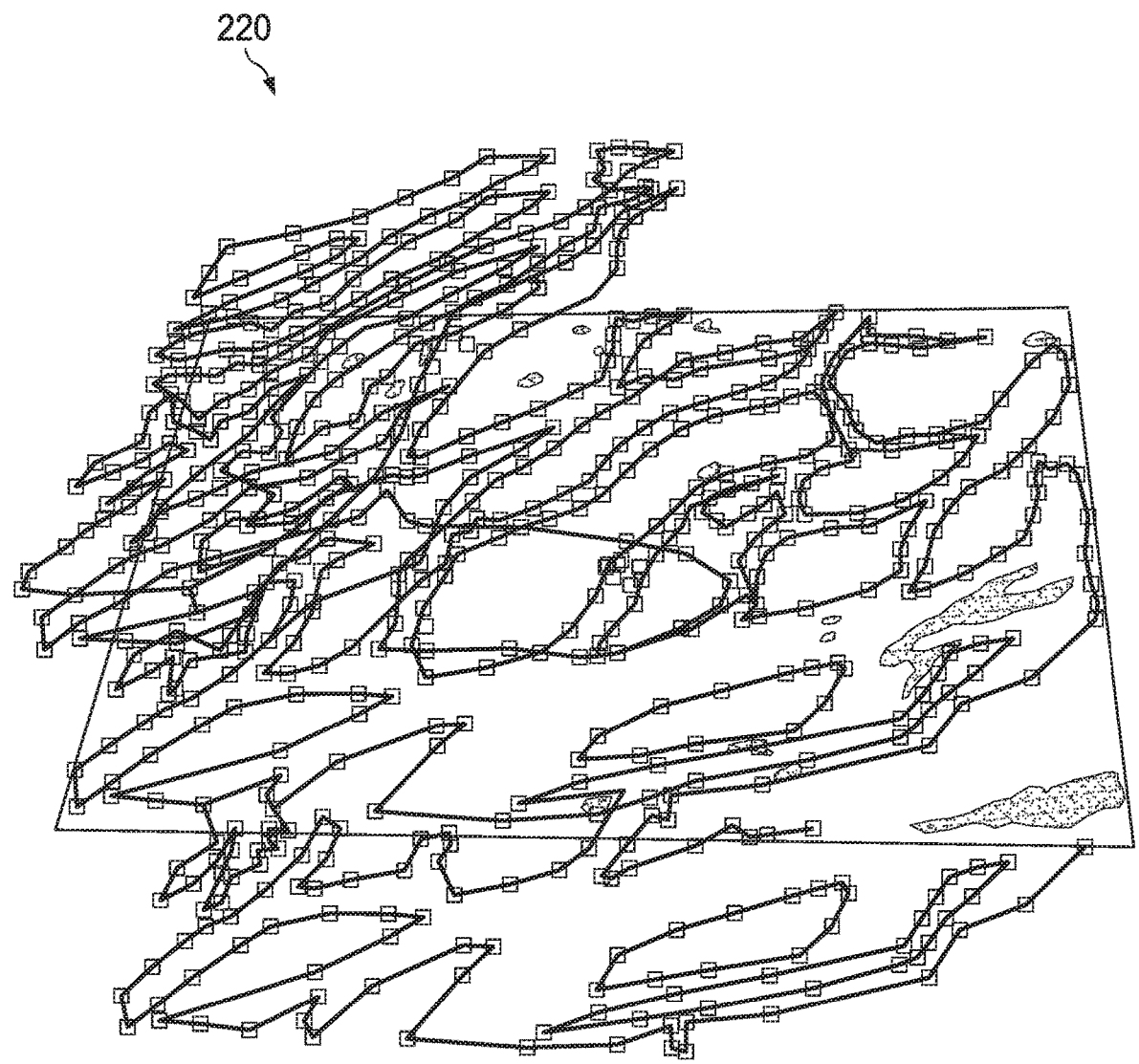

An example of this multi-Z interpretation step is depicted in FIG. 2A-2B, which show a multi-Z interpretation of fluvial channels on successive 3D time-slices. FIG. 2A depicts the multi-Z interpretations 200 at 1140 ms, while FIG. 2B depicts the final multi-Z interpretation object 220. As an analogy, a 3D vanilla cake (e.g. the earth, the 3D seismic volume) with chocolate filling (oil reservoir, geobody) within it. The described system is looking for the oil reservoir (which may be in the fluvial channels of high porosity) or chocolate filling which has a varying shape along the depth axis (time in milliseconds in 3D seismic). Like the example above, say the chocolate filling exists between 2.6 seconds and 3.1 seconds. A horizontal cut (time slice) at 0.8 seconds does not depict any chocolate filling at all but vanilla flour. Whereas a slice at 2.8 seconds, depicts the shape of distribution of the chocolate filling. And a slice at 3.0 seconds, also depicts the chocolate filling but with different areal distribution. Continuing with the example, the chocolate filling is not uniform in shape along the Z (time) axis. The 3D shape of the chocolate filling (or geobody) is what the system is "looking" for. For example, the shape may be an hour glass such that in a certain X, Y surface location, moving downward, there is the same geobody at 2.6, 2.7, 2.8, 3.1, 3.2 seconds; however, continuing with the hour glass example, the geobody will not be encountered at 2.9 and 3.0 seconds due to the "waist" curve in section. Thus, the 2.6, 2.7, 2.8, 3.1, and 3.2 seconds of the same geobody at one X, Y location is the meaning of our Multi-Z (time axis) interpretation. Thus FIG. 2A, is the interpretation at 1140 ms, and FIG. 2B depicts the more complete interpretation of the same geobody at multiple depths (Z value). In some examples, the idea is to interpret the geobody (fluvial channels in this case) at enough time-slice intervals to get an accurate representation of its 3D geometry. The end result can therefore include a multi-Z interpretation object that represents the geobody (channel distribution), where individual 'multi-Z interpretations' at different time-slices are all part of the same multi-Z object.

After completion of the initial multi-Z interpretation framework at representative intervals through the seismic volume, the interpretation object is converted into basic polygons. Multi-Z Interpretation 'framework' in this context may include another way of referring to the multi-z interpretation object (described previously). In some implementations, when viewed, the completed multi-Z interpretation object appears as a framework that outlines the 3D geometry and refers to the interpretation technique of finding and recognizing the same object (e.g. geobody, horizon) occurring multiple times in the Z axis (e.g. time, depth) at a single surface location (X/Y coordinates, Inline/Crossline).

Figure 3A:
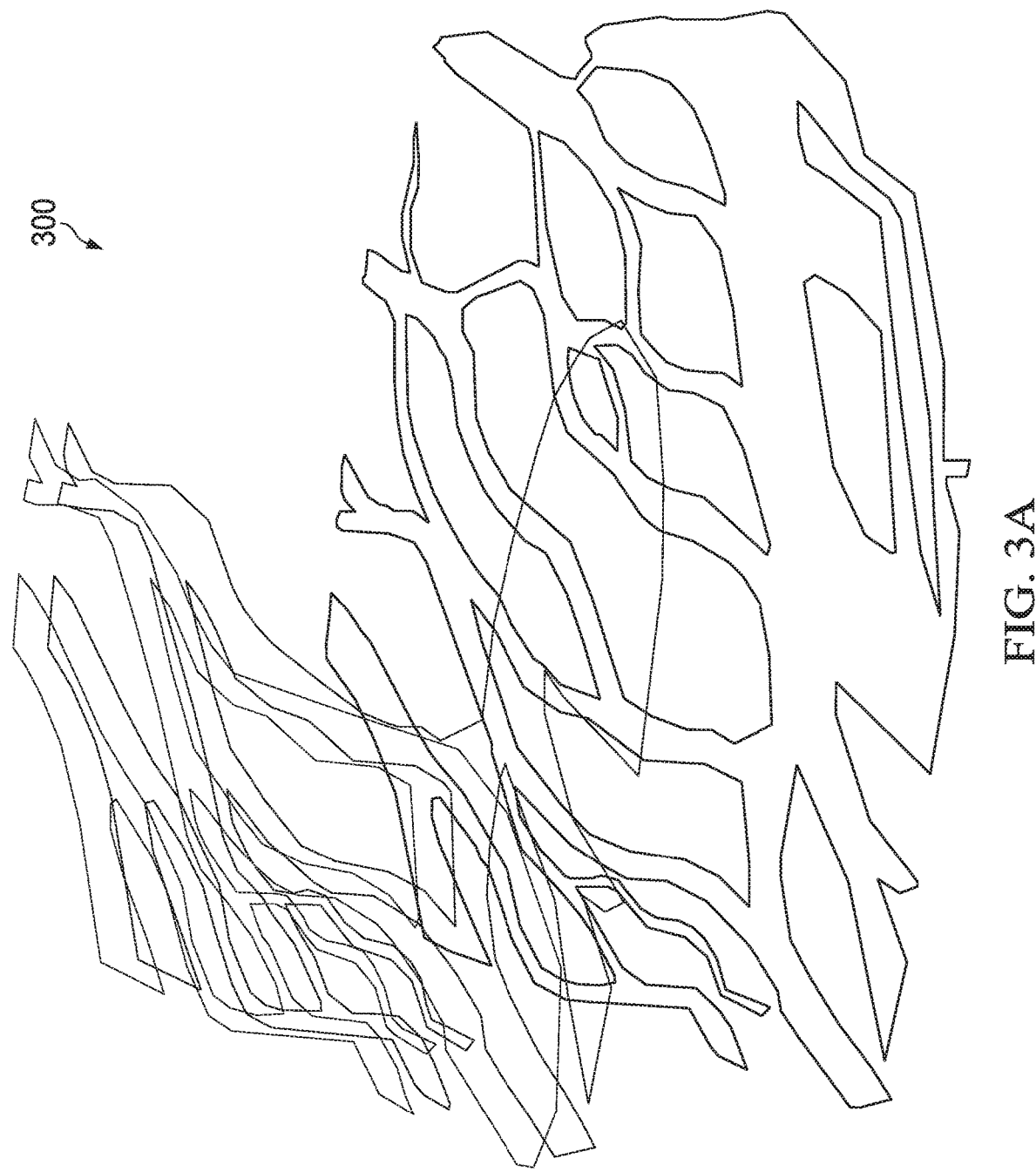
FIG. 3A depicts the result of a conversion of a multi-Z interpretation object to polygons.
Figure 3B:
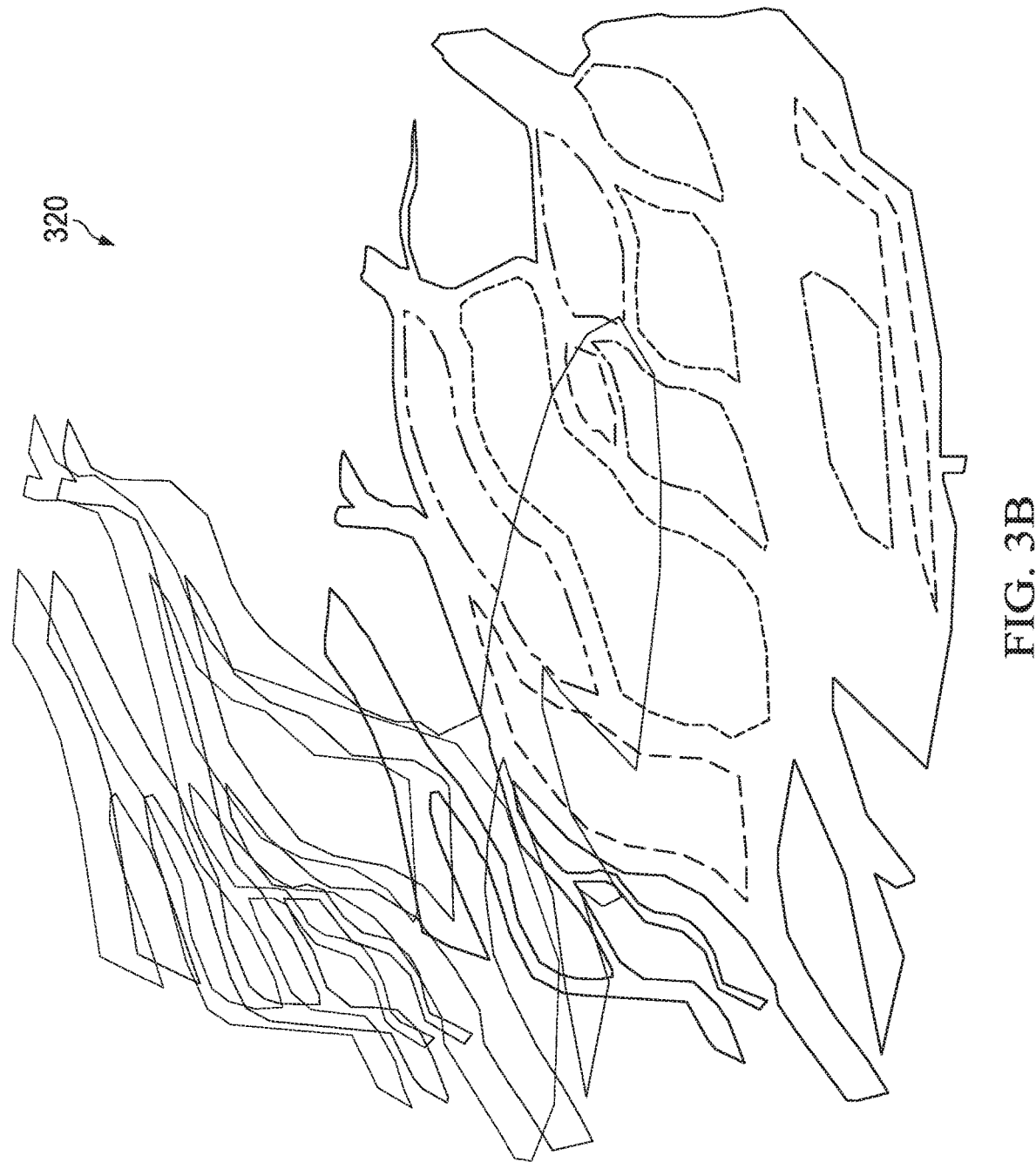
FIG. 3B depicts the result of appending polygons together at representative intervals.

FIG. 3A depicts the result 300 of a conversion of a multi-Z interpretation object to polygons, while FIG. 3B depicts the result 320 of appending such polygons together at representative intervals. In some implementations, when an initial conversion creates many individual polygons, each can be appended together into a single polygon at each representative interval. Similarly, this operation can easily be done in most commercial exploration software applications by applying basic polygon operations;

The combined polygons are then gridded individually to create constant Z-value surfaces at each representative interval. For example the assigned z-value of the interpreted polygon at −1148 ms would be given a value of −1148. This step can be performed using an artificial gridding algorithm to create a constant z-value surface within a boundary polygon. An artificial gridding algorithm may be used to artificially insert points into a grid (2D array) at a specified depth (e.g. time slice) within an area or polygon (in this case the interpreted outline of the channel system). The array points can later be assigned an attribute value in a separate step (a constant, unique attribute value different to the surrounding seismic amplitude values is assigned in this workflow to represent the geobody). Conversely, a traditional gridding algorithm uses input data points, which typically have different attribute values, and averages them into a 2D grid at regularly spaced intervals. Different interpolation methods or algorithms may be used to create traditional grids of data points.

Figure 4:
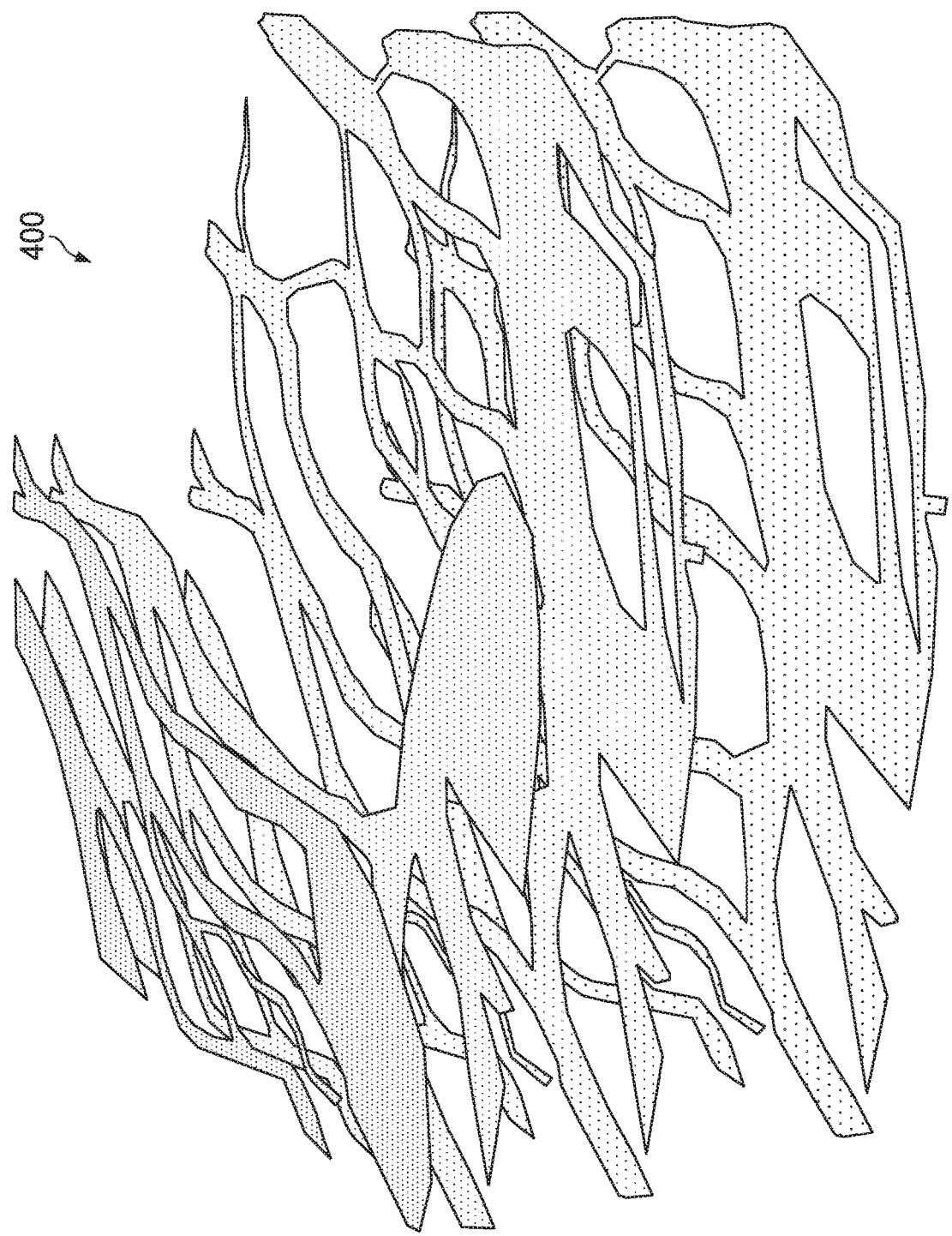
FIG. 4 depicts an example of infilled polygons.

As depicted in FIG. 4, the appended polygons are infilled to form infilled polygons 400. In some implementations, the infilled polygons are created to provide initial control for the construction of a 3D geometry of the respective fluvial channel system. The gridded surfaces are converted to points, which can then be replicated at successive intervals by applying a mathematical addition or subtraction to generate a body of points. Such a body of points represents the 3D channel system at multiple levels.

Figure 5A:
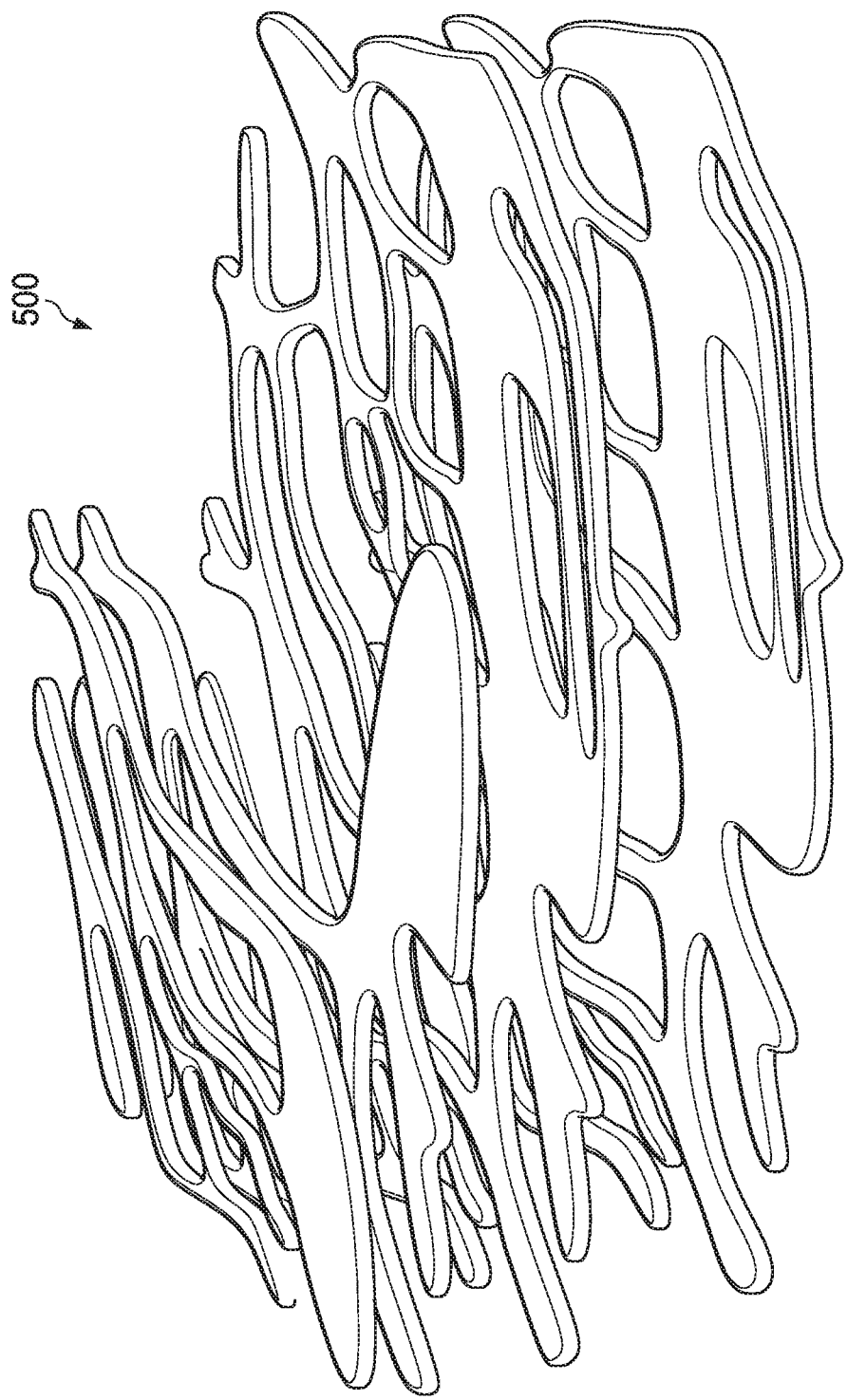
FIGS. 5A-5B depict an example conversion process and replication of points to form a channel body.
Figure 5B:
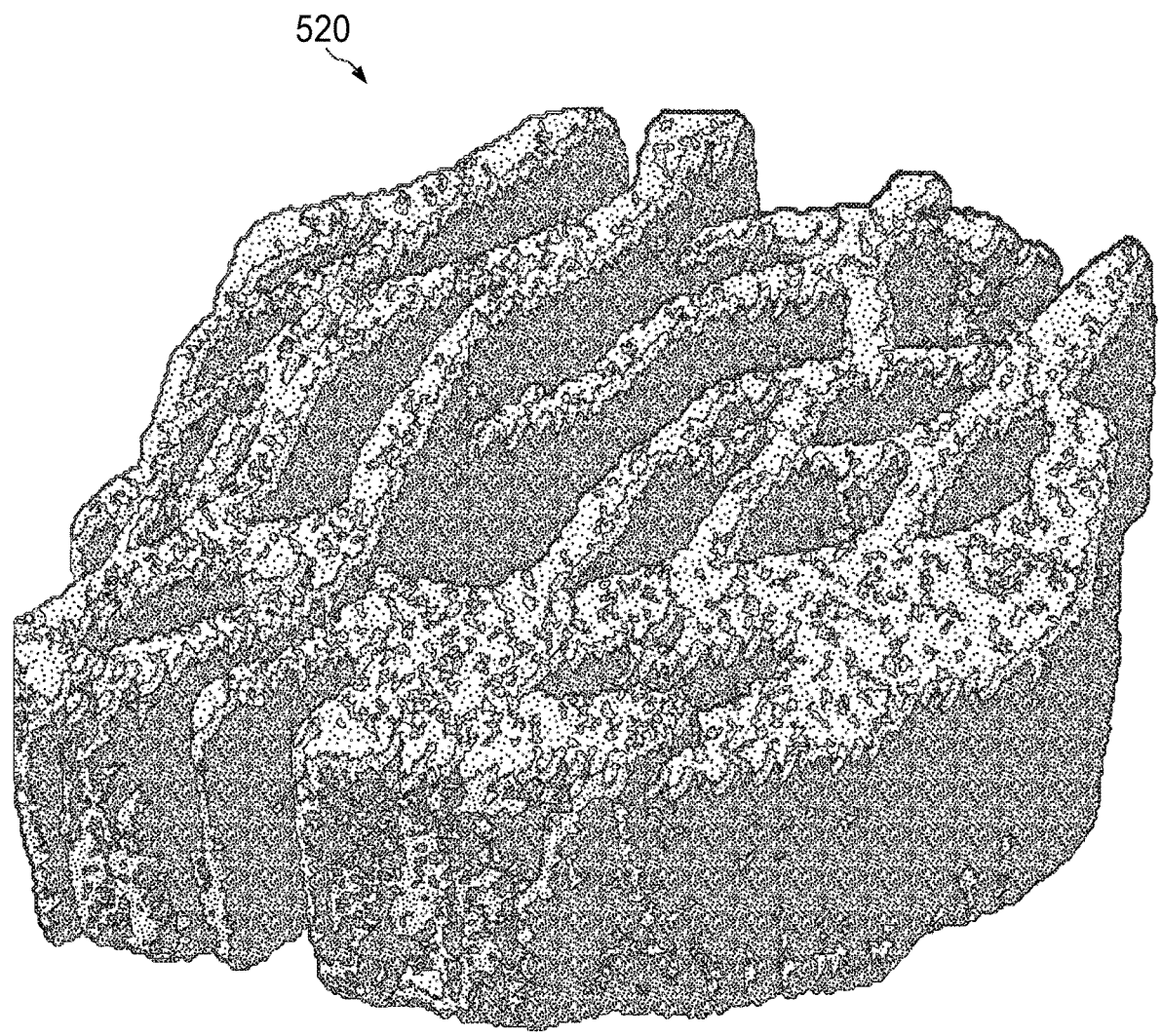

FIGS. 5A-5B depict an example conversion process and replication of points to form the channel body. FIG. 5A depicts example results 500 of converting infilled polygons to points. FIG. 5B depicts example results 520 of a replication at successive intervals of points to form the respective channel body. The resultant extracted geobody (value 10) depicted in FIG. 5B, depicts the geobody in three dimensions. In some implementations, the interpreted points are assigned a distinctive property value that may be employed for geobody extraction. In some implementations, the property value is assigned a value that is slightly beyond a range of 3D seismic amplitude values determined based on the statistics of the 3D seismic volume. This assignment of the property value is designed to distinguish points inside, versus outside the geobody, easily in subsequent processes. For example, if the seismic amplitude values in a 3D seismic volume range is between 100000 and 300000, the property value is usually a floating number and quite large, and can be determined by viewing the statistics of the volume. If three channel geobodies (A, B, C) are identified, amplitude values may be assigned to grid points in these geobodies, for example, 10. Therefore, a subsequent computer operation encounters the number (amplitude) 10, which indicates that it is a channel geobody. Conversely, when a larger amplitude number (e.g., 200000 is encountered the indication is that it is not inside the geobody. Therefore, the assigned value of 10 is not "slightly beyond", but uniquely "outside the range" of the surrounding property values, which range between 100000 and 300000.

Figure 6:
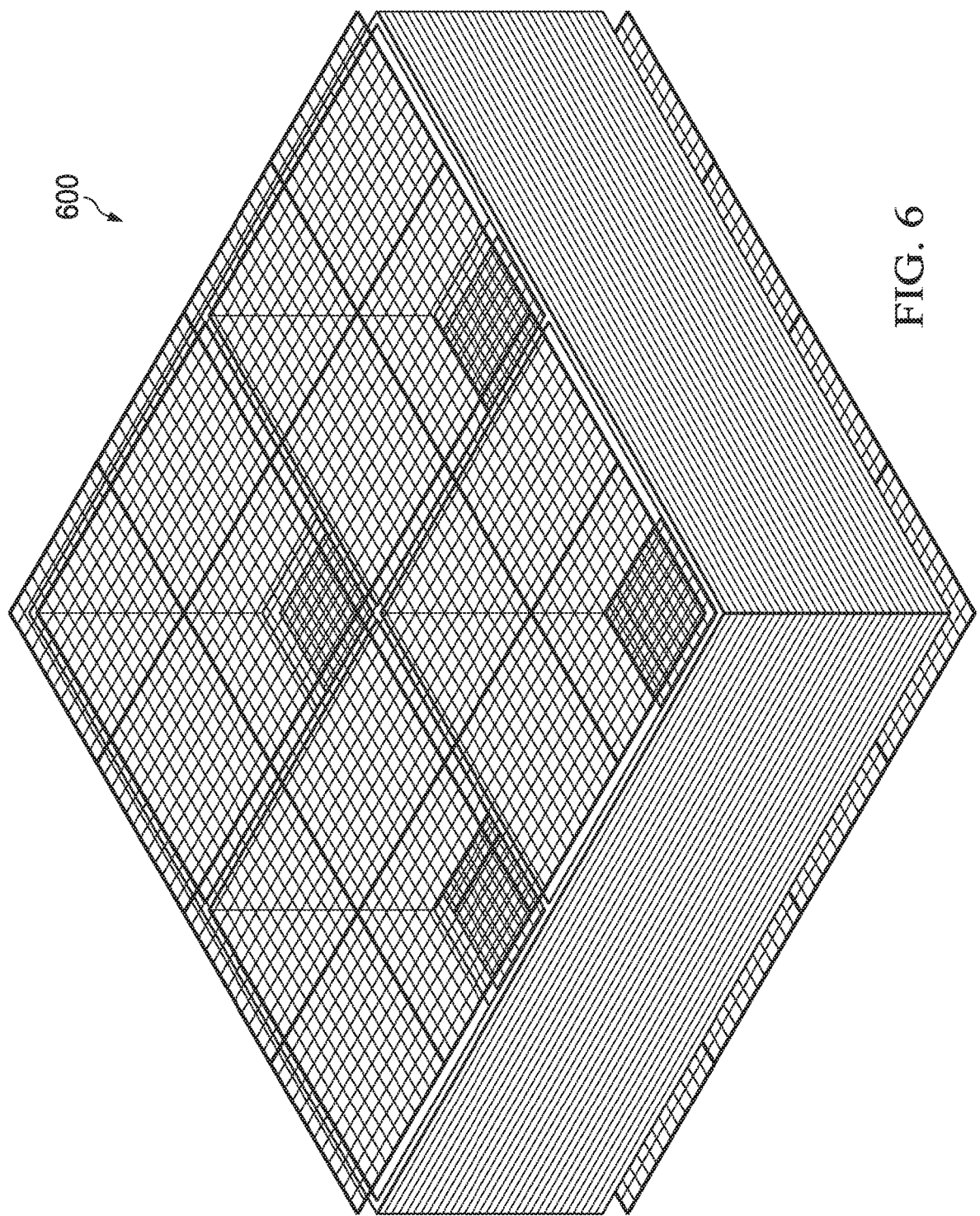
FIG. 6 depicts a 3D cellular grid that can be employed for property modeling according to implementations of this disclosure.
Figure 7A:
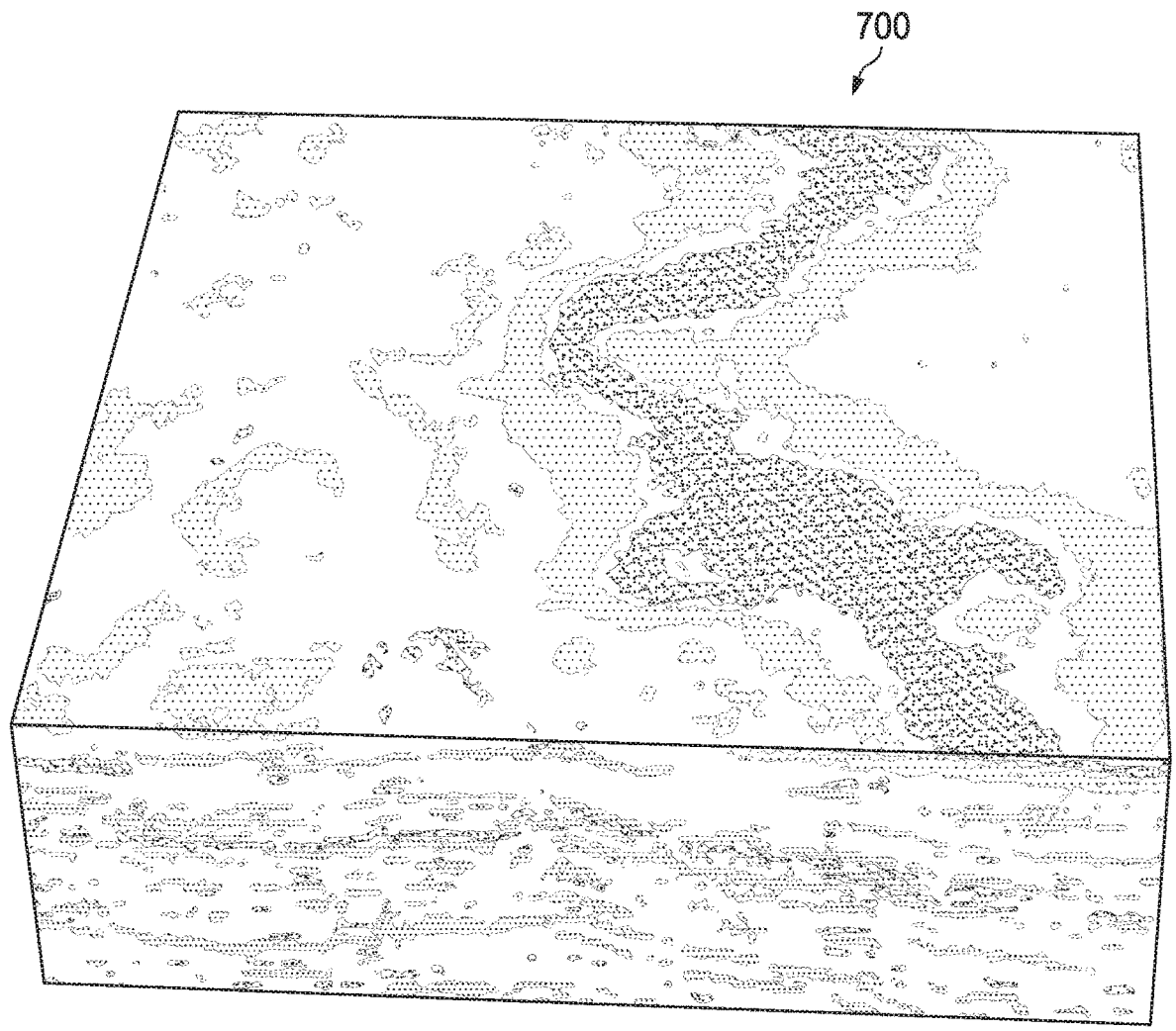
FIGS. 7A-7B depict an example of a 3D seismic volume and the interpreted points resampled and upscaled respectively into a 3D cellular grid.
Figure 7B:
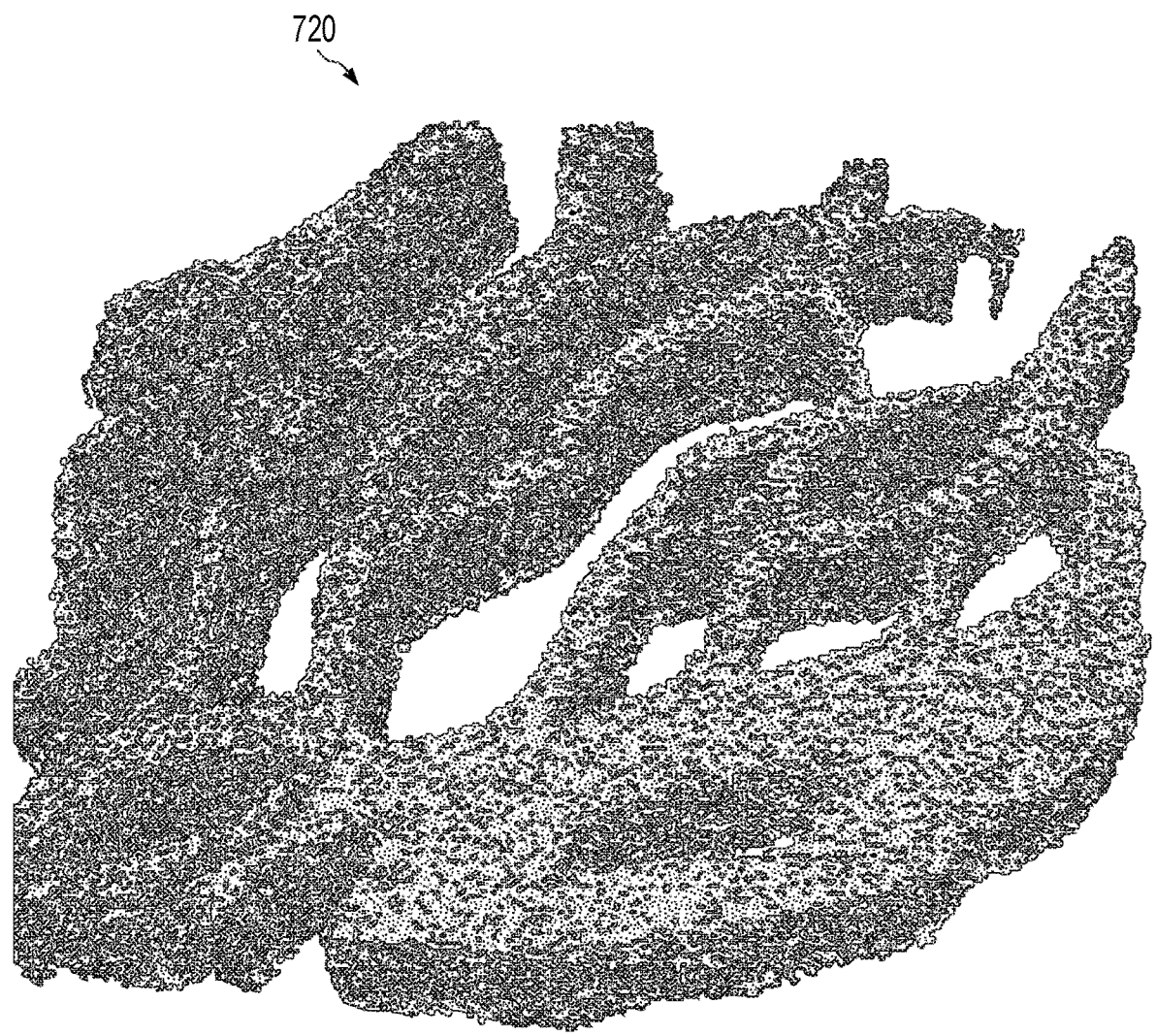
Figure 8:
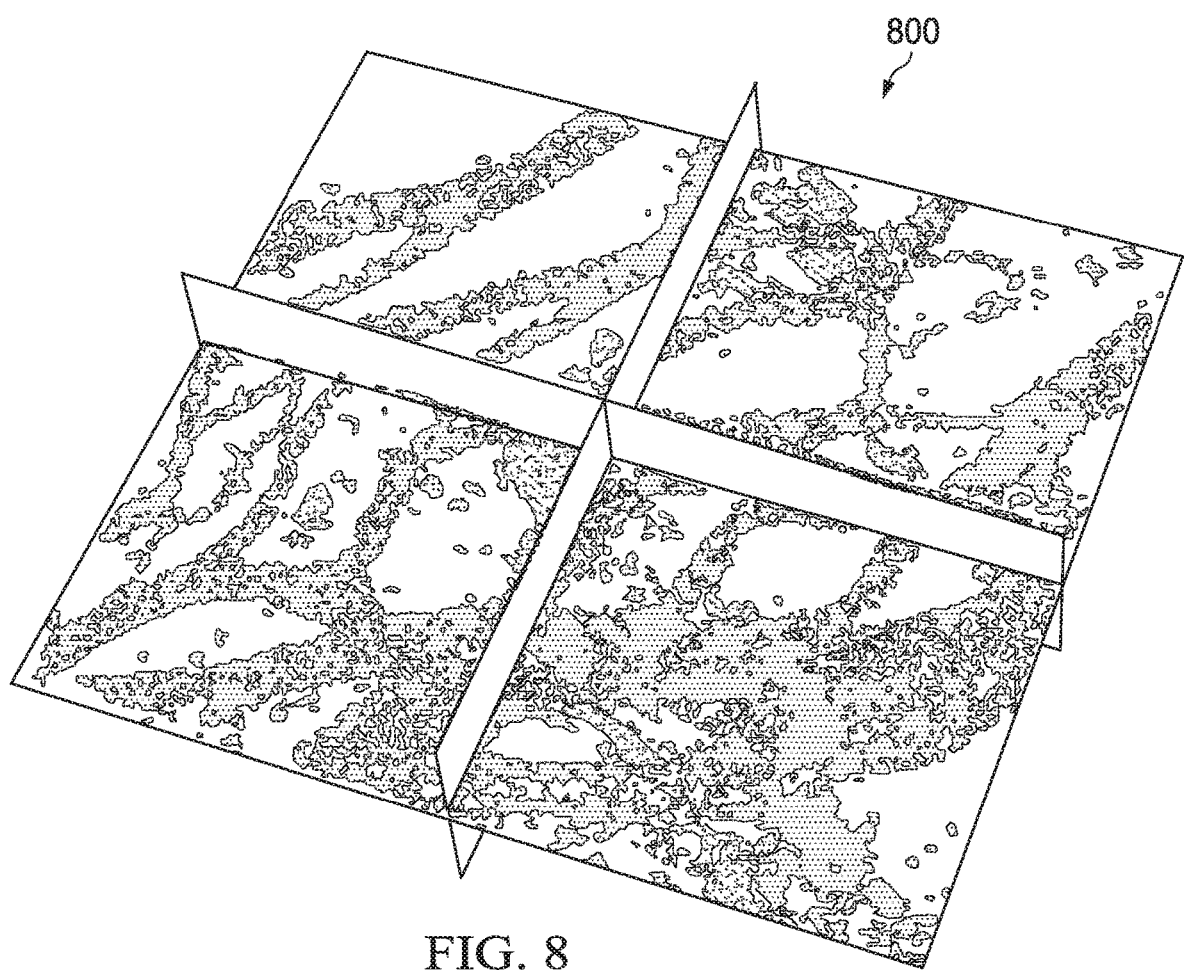
FIG. 8 depicts an example of a single blended 3D property model that may be employed according to implementations of this disclosure.

FIGS. 6-11 depict the generation of a 3D cellular model that can be used to manipulate interpretation data generated in the previous FIGS. 1-5B. FIG. 6 depicts a 3D cellular grid 600 that can be employed for property modeling. As depicted in FIG. 6, the upper and lower extents of the 3D cellular grid 600 coincide approximately with the top and base of the interpreted channel system, and the XY extents are defined according to the area of interest. The original 3D seismic volume and the interpreted points (with assigned unique values) may then be resampled, depicted as 700 in FIG. 7A, and upscaled, depicted as 720 in FIG. 7B, into the 3D cellular grid. The two properties may then be combined using an IF statement function to form a single blended 3D property model 800 as depicted in FIG. 8 as 800.

For example, a 3D cellular model framework that has the same XYZ geometry as the seismic volume may be created, which will be used for property modeling (the geometry of the simple 3D model (3D cake) is depicted in FIG. 6). Next, property values are generated (populated) at each cell within the model. First the 3D seismic volume is resampled and 'upscaled' into the 3D model, which may have properties ranging (e.g., from 100000 to 300000). In some implementations, this process essentially assigns an average property value to each cell node from the original seismic cube amplitudes. Similarly, the points of the channel geobody (value of 10), can be upscaled into the 3D model as a separate property attribute (e.g., any cell in a 3D model may be associated with multiple attributes, such as seismic amplitude, points, and porosity). The two upscaled attributes can then be combined into a third property attribute using an IF statement such that IF the geobody value exists then populate it into the model cells, ELSE use the property values from the 3D seismic cube to populate the remaining cells. This results in a blended property model, such as depicted in FIG. 8.

The blended property model 800 can then be converted from the 3D property modeling domain to the original interpretation domain in, for example, Society of Exploration Geophysicists (SEG)-Y or a proprietary internal storage format. In some implementations, a blended property model is a model comprising attributes that combine the original input data value (e.g. seismic amplitude) and channel indicator value (e.g. constant value of 10 for inside the geobody). This way, both stratigraphic information (e.g. seismic amplitude) and channel geometry (e.g. inside or outside a channel geobody) are preserved in a single blended 3D model, which can be processed easily in follow-up indicator-based processing.

This blended seismic volume includes the interpreted channel systems, with uniquely assigned values, in the original seismic data. The channel system can then be isolated using traditional geobody extraction techniques, as depicted in FIGS. 9A-9C.

Figure 9A:
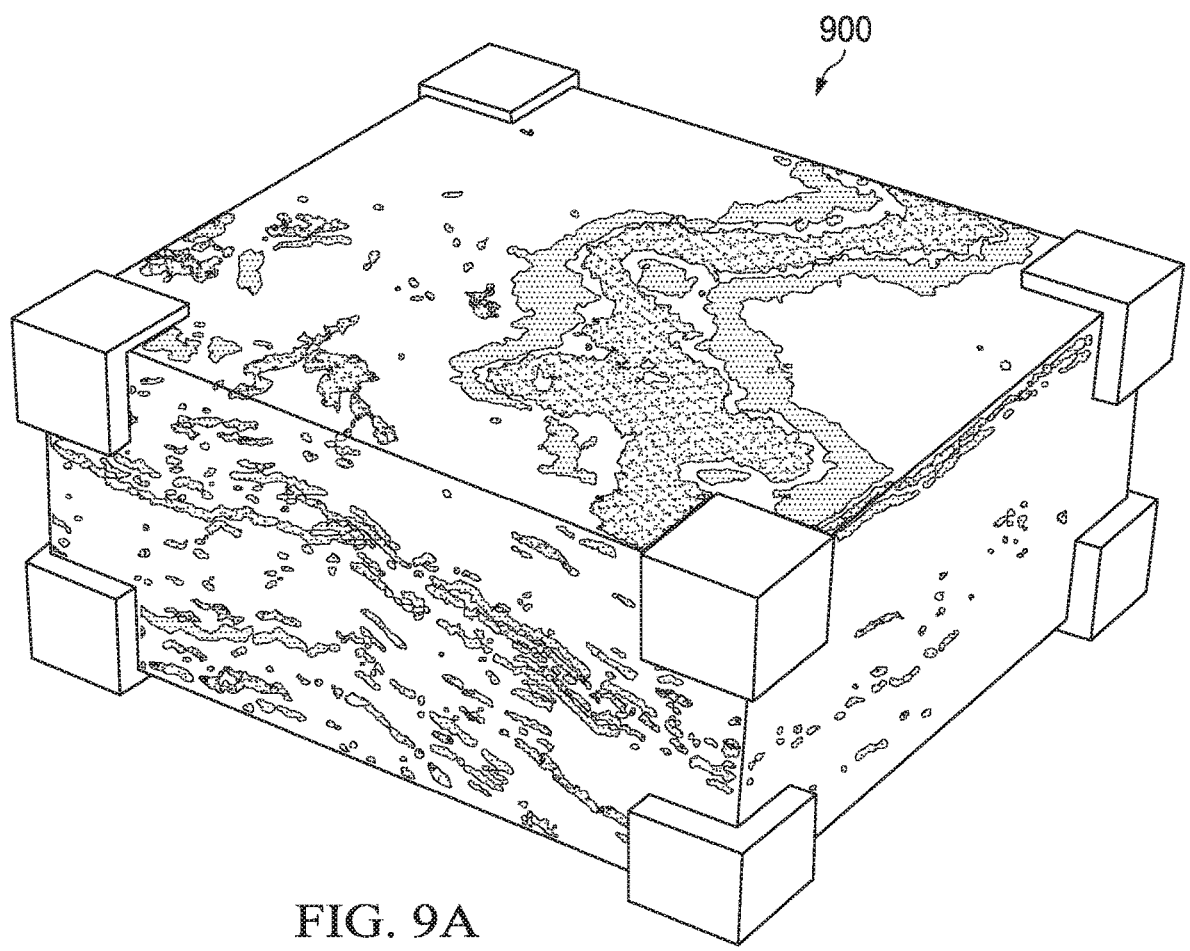
FIG. 9A-9C depict examples of an isolated channel system.
Figure 9B:
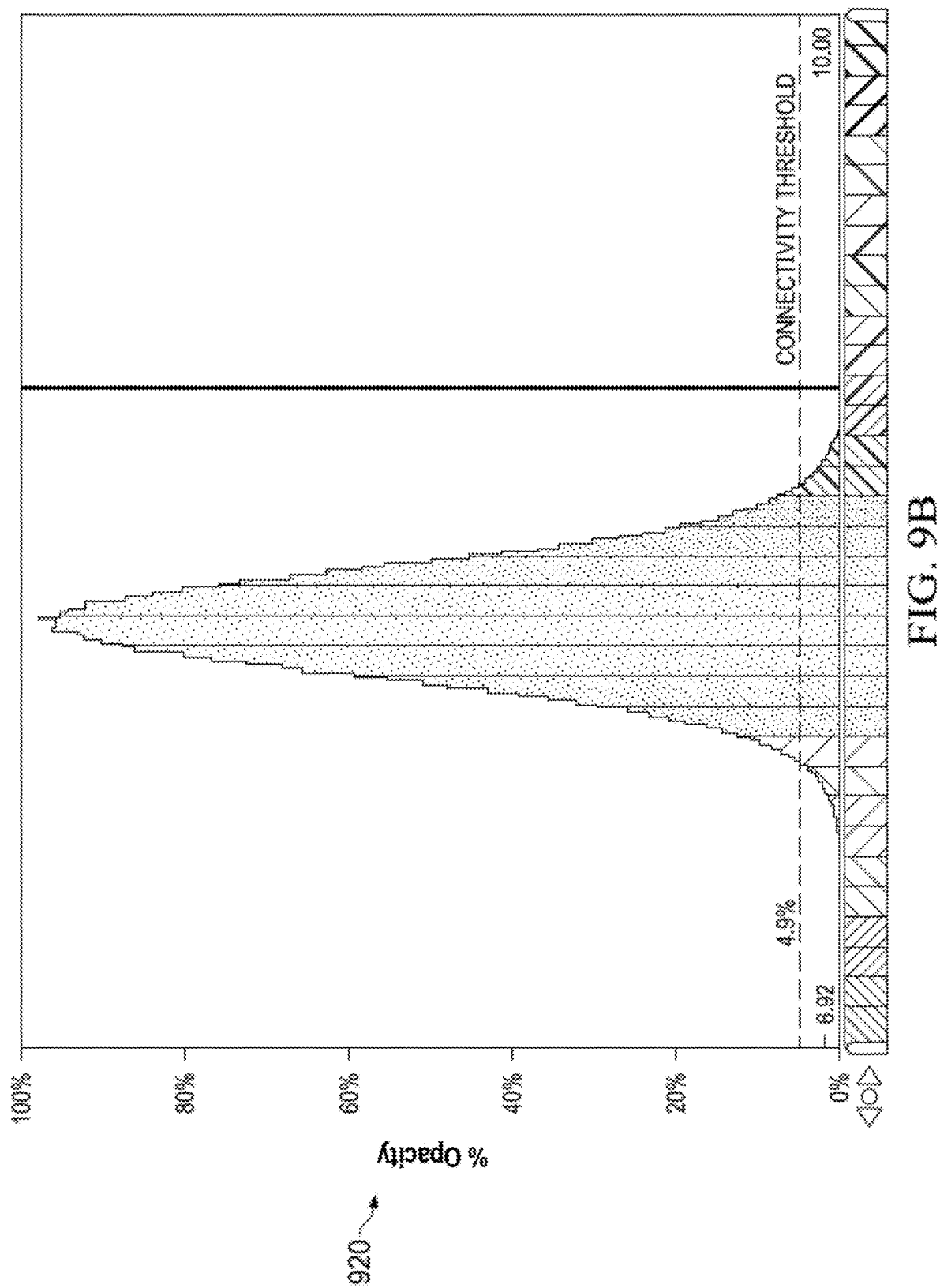
Figure 9C:
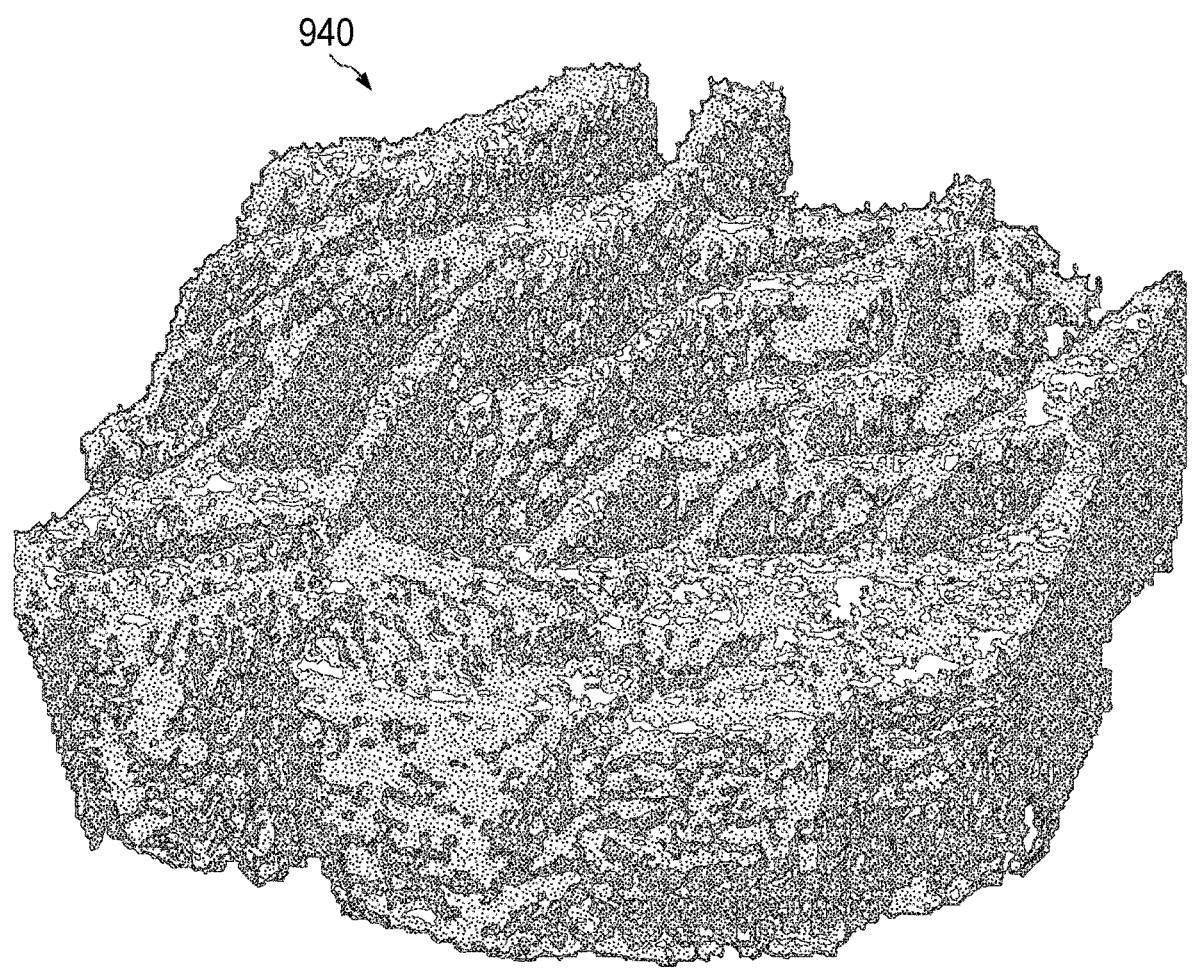

FIG. 9A depicts a seismic probe display 900 that represents the 3D blended property model after being converted back to standard industry SEG-Y format, which is the same format as the original seismic volume. However, its amplitude values have been modified as mentioned earlier, so the channel body amplitudes are now 10, and easily distinguishable from the ambient seismic amplitudes of 100000-300000. In 900 the shape of the channel is depicted in a horizontal time slice section. FIG. 9B depicts a graphical representation 920 of the opacity (or transparency) filter. For example, when the opacity filter is set to show only properties of value 10 (100% showing) and all other property values are made transparent (0% showing) then the channel geobody may be the only part showing in the volume. FIG. 9C depicts a final result 940 that comprises an accurately delineated three-dimensional channel geobody.

Figure 10:
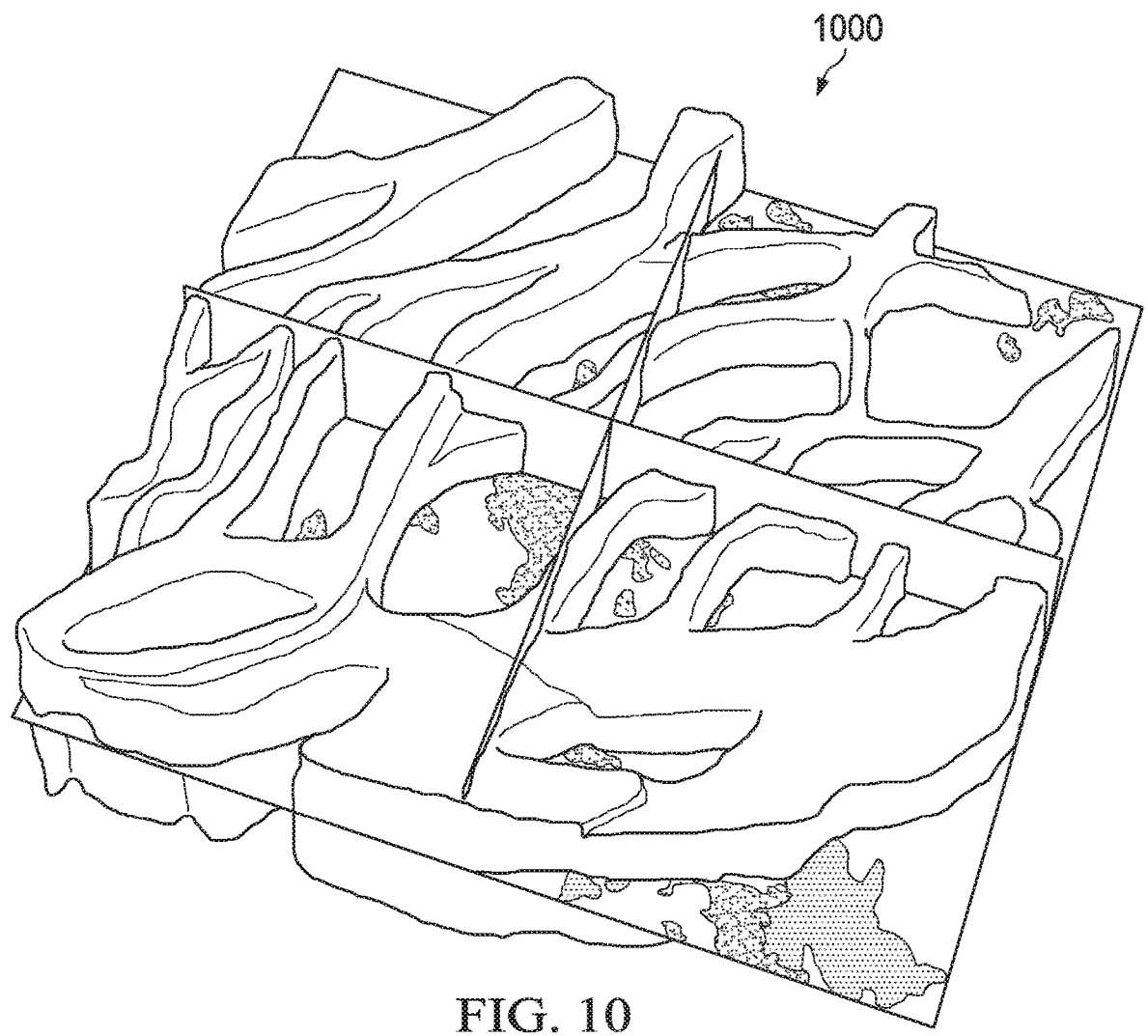
FIG. 10 depicts an example output of an extracted geobody.

FIG. 10 depicts an example output 1000 of an accurately delineated three-dimensional channel geobody (e.g., the result of applying the transparency filter). Only the shapes of several channel geobodies (property value 10) are showing. Continuing with the cake example, this figure is like dissolving all the vanilla flour and only exposing the chocolate filling 3D shape.

The ability to interpret with accuracy the three-dimensional geometry of complex channel systems contributes significantly to enhanced understanding and successful exploration and production outcomes. As such, the output 1000 (as well as the output 1120 and 1140 from FIGS. 11B and 11C respectively) can be used for a variety of purposes, such as well planning, reservoir geosteering, property and facies modeling, reservoir characterization and development, and other exploration and development activities. For example, horizontal wells may require accurate spatial guidance in order to efficiently track and drain geometrically complex hydrocarbon zones within a reservoir. This can be done if the target channel reservoir is accurately interpreted and delineated. Similarly, the likelihood of success during exploration drilling increases when the target reservoir is clearly interpreted, such as through the described geobody-interpretation system. Further uses of the interpreted output from the described geobody-interpretation system, include using the body, either in its extracted geobody form or 3D cellular model form, to guide facies and property modeling activities.

Figure 11A:
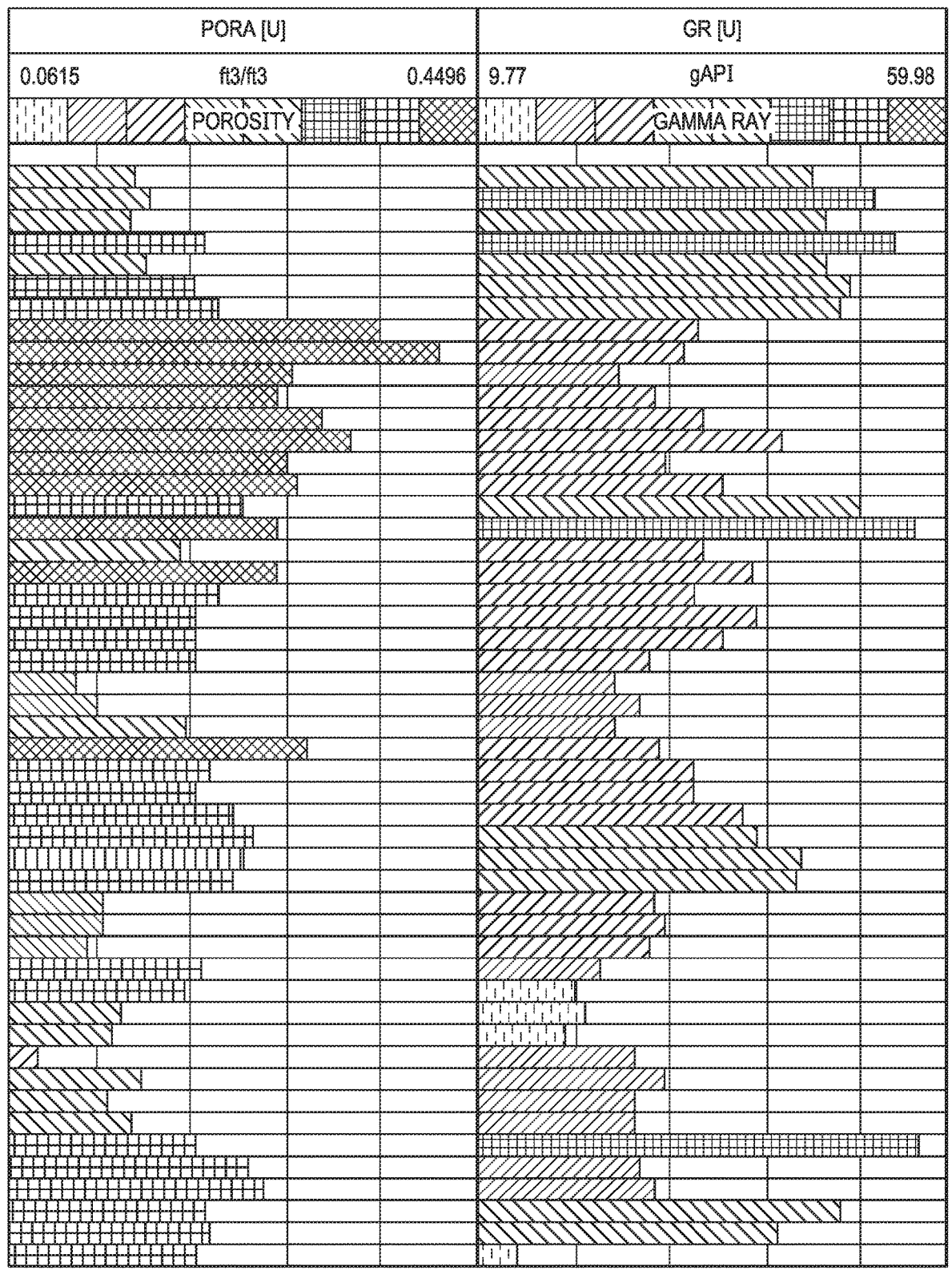
FIGS. 11A-11C depict an example of guided porosity modeling using upscaled interpretation points.
Figure 11B:
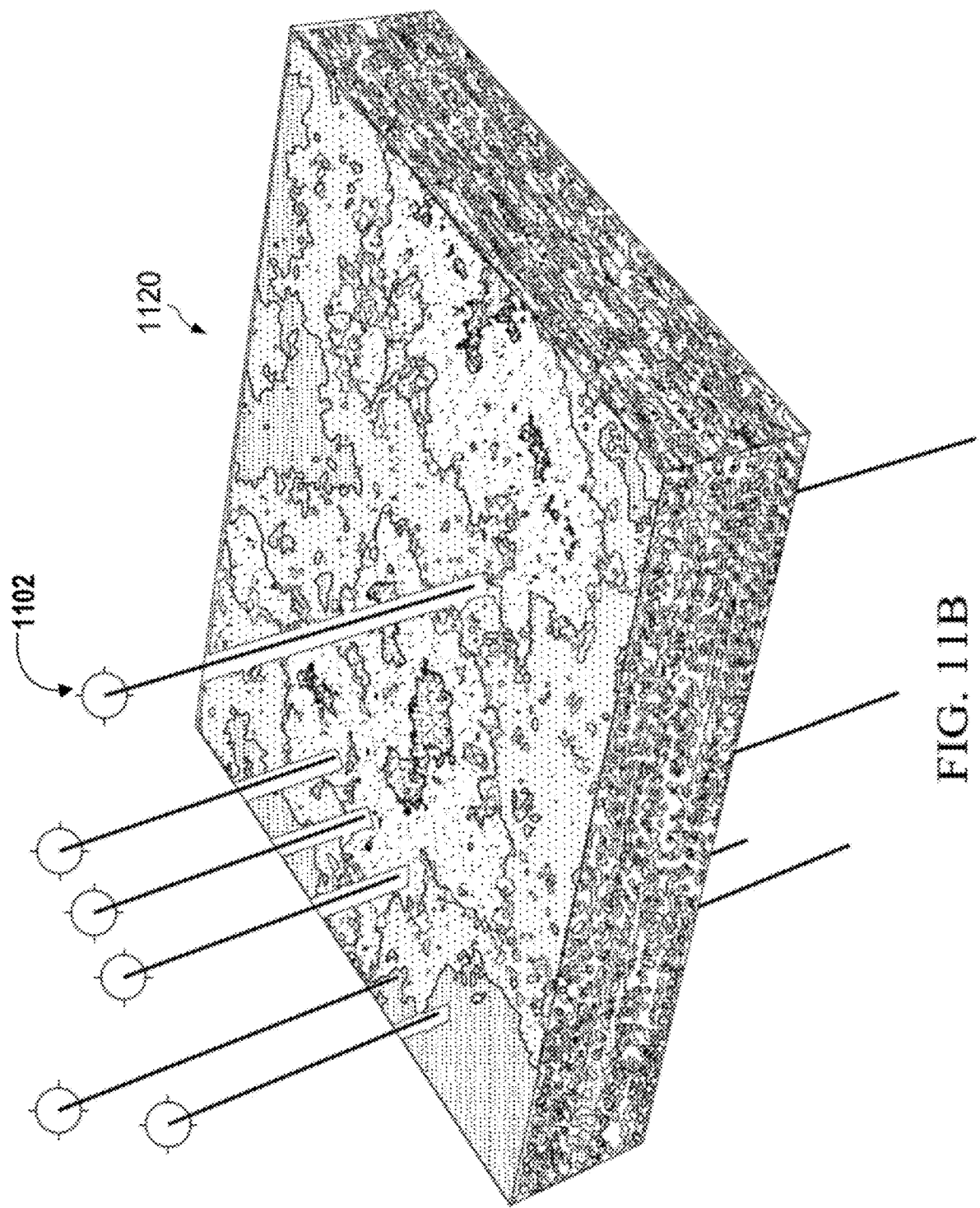
Figure 11C:
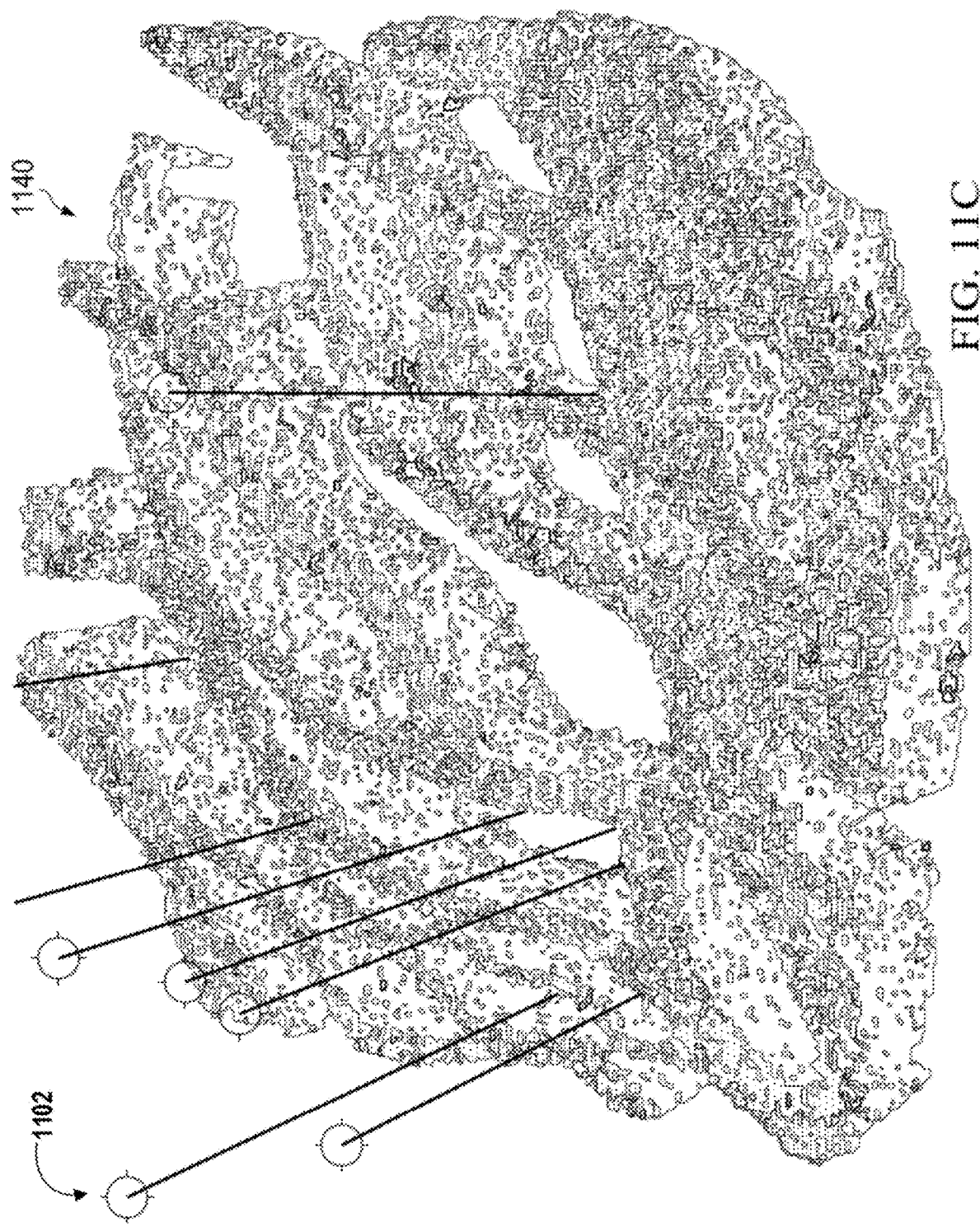

FIGS. 11A-11C depicts an example of guided porosity modeling using upscaled interpretation points. In the depicted, the upscaled channel points are used to guide the property modeling process using porosity logs. As depicted, log porosity measurements from six wells are upscaled and modeled into the 3D property model. Not only is the channel geometry clearly defined, but the porosity distribution within the channels can also be seen. Such detail can be critical to understanding the geological environment and can heavily influence operational planning decisions, such as described above.

FIG. 11A are input well logs 1100 at a representative well location. The porosity (PORA) log measures rock porosity, and the gamma (GR) log measures radioactivity of the rock (these are just examples, there are many other types of logs that could be used instead). In this example the porosity log type is input into the 3D property model using traditional property modeling methodology. FIG. 11B depicts an example output 1120 that shows six wells (straight lines 1102) that all contain the same well log type as in FIG. 11A. These wells provide hard (measured) data to be fed into the 3D property model. Therefore, a 3D property model can be built with porosity values (or any other log property depending on the objective) populated in the 3D model. In this example, we are only interested in modeling the porosity variations inside the channel geobodies. FIG. 11C depicts a combination 1140 that utilizes the physical geometry of the extracted channels (geobody) and the associated porosity variations within that body (stratigraphic changes). In some implementations, the described system combines structure (which is difficult to extract) and stratigraphic change which are both critical in the search for oil and gas.

Figure 12:
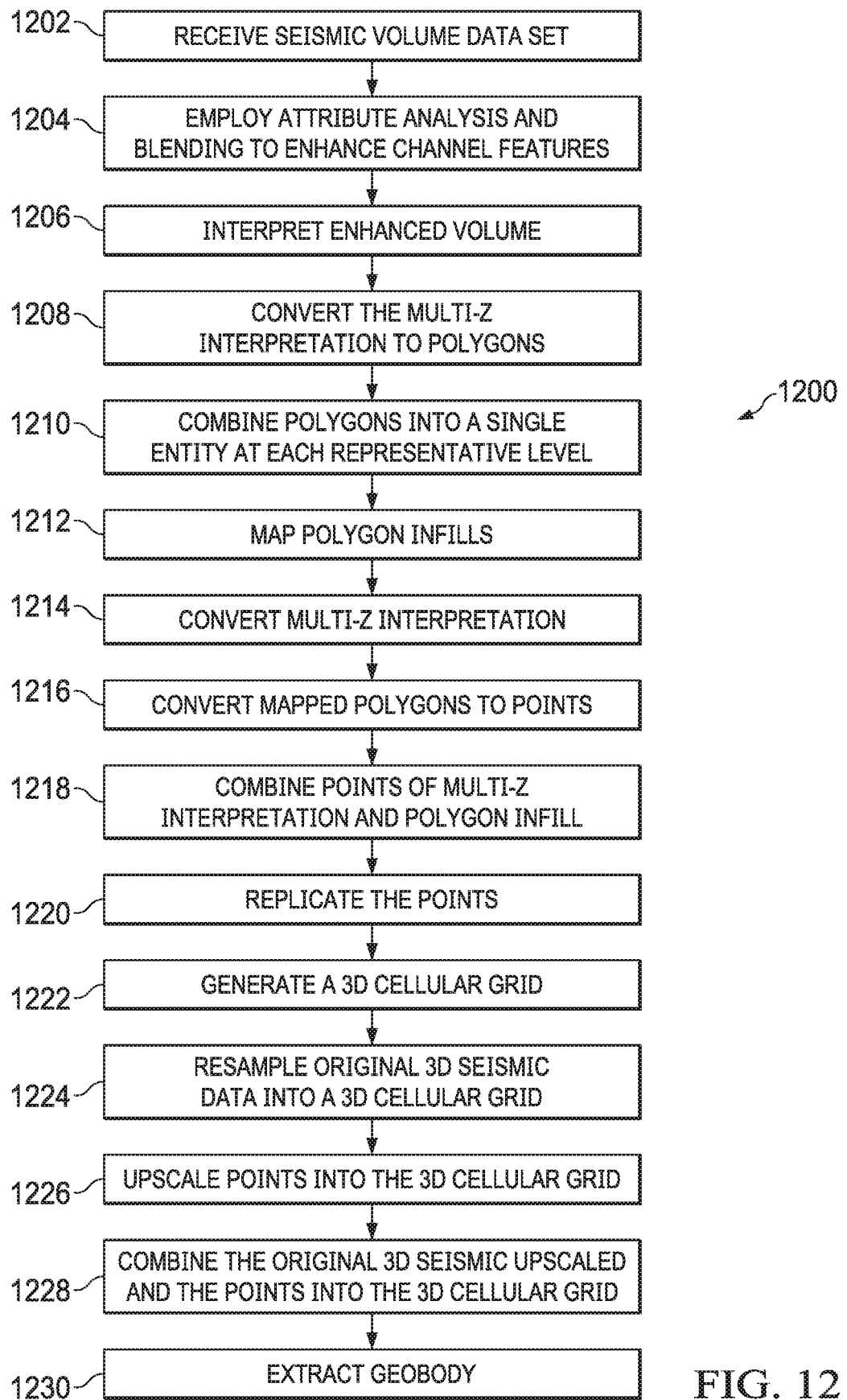
FIG. 12 depicts a flow diagram of an example process employed to interpret fluvial channels data.

FIG. 12 depicts a flow diagram of an example process 1200 employed to interpret fluvial channels data in, for example, the exploration and production of hydrocarbons. For clarity of presentation, the description that follows generally describes method 1200 in the context of FIGS. 1A-11C and 13. However, it will be understood that method 1200 may be performed, for example, by any other suitable system, environment, software, and hardware, or a combination of systems, environments, software, and hardware. In some implementations, various steps of method 1200 can be run in parallel, in combination, in loops, or in any order.

At 1202, a seismic volume data set or data cube is received. At 1204, the 3D seismic volume is conditioned using attribute analysis and blending to enhance channel features. At 1206, the enhanced volume is interpreted based on, for example, multi-z interpretation polygons on representative time slices of edge detected attributes. At 1208, the multi-z interpretation is converted to polygons. At 1210, polygons are combined, when necessary, into a single entity at each representative level. At each representative level (time slice), multiple channels may exist. These channels can be represented as polygon outlines (created in earlier steps), which are combined here into a single polygon for simplification purposes. At this stage the combined polygons may not contain any data points inside, they are just shape outlines. For example, these are now just regular polygons (not multi-z anymore).

At 1212, polygon infills are mapped using artificial gridding algorithm at a constant z-value. In some implementations, this step creates infill grid nodes (regularly spaced grid nodes) inside the polygons, as depicted in FIG. 4. These grid nodes are then converted into points in 1216, as depicted in FIG. 5A. At 1214, multi-z interpretation are converted to points. At 1216, mapped infilled polygons are converted to points, as depicted in FIG. 5A. At 1218, points of multi-z interpretation and mapped infilled polygon points are combined into single entity (e.g., an object of points). At 1220, the points are replicated using simple operations to form a channel body. At 1222, a 3D cellular grid is generated. At 1224, the original 3D seismic data is resampled into 3D cellular grid. At 1226, the points are upscaled into 3D the cellular grid. At 1228, a property calculator is used to combine the original 3D seismic upscaled into the 3D cellular grid and the points upscaled to the 3D cellular grid. At 1230, a geobody is extracted. The extracted geobody and upscaled points may be employed in exploration and production processes.

Figure 13:
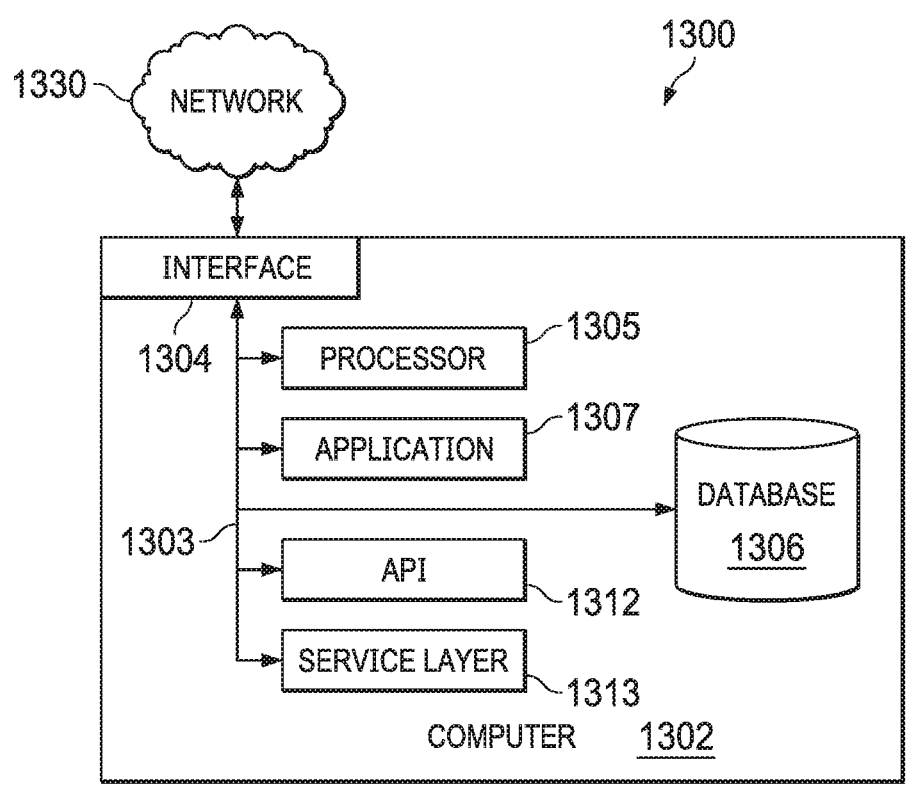
FIG. 13 depicts a block diagram of an exemplary computer system used to provide computational functionalities associated with described algorithms, methods, functions, processes, flows, and procedures as described in the instant disclosure, according to an implementation.

FIG. 13 depicts a block diagram of an exemplary computer system 1300 used to provide computational functionalities associated with described algorithms, methods, functions, processes, flows, and procedures as described in the instant disclosure, according to an implementation. The illustrated computer 1302 is intended to encompass any computing device such as a server, desktop computer, laptop or notebook computer, wireless data port, smart phone, personal data assistant (PDA), tablet computing device, or one or more processors within these devices, including both physical or virtual instances (or both) of the computing device. Additionally, the computer 1302 may comprise a computer that includes an input device, such as a keypad, keyboard, touch screen, or other device that can accept user information, and an output device that conveys information associated with the operation of the computer 1302, including digital data, visual, or audio information (or a combination of information), or a GUI.

The computer 1302 can serve in a role as a client, network component, a server, a database or other persistency, or any other component (or a combination of roles) of a computer system for performing the subject matter described in the instant disclosure. The illustrated computer 1302 is communicably coupled with a network 1330. In some implementations, one or more components of the computer 1302 may be configured to operate within environments, including cloud-computing-based, local, global, or a combination of environments.

At a high level, the computer 1302 is an electronic computing device operable to receive, transmit, process, store, or manage data and information associated with the described subject matter. According to some implementations, the computer 1302 may also include or be communicably coupled with an application server, e-mail server, web server, caching server, streaming data server, business intelligence (BI) server, or other server (or a combination of servers).

The computer 1302 can receive requests over network 1330 from a client application (for example, executing on another computer 1302) and responding to the received requests by processing the said requests in a software application. In addition, requests may also be sent to the computer 1302 from internal users (for example, from a command console or by other access method), external or third parties, other automated applications, as well as any other entities, individuals, systems, or computers.

Each of the components of the computer 1302 can communicate using a system bus 1303. In some implementations, any or all of the components of the computer 1302, both hardware or software (or a combination of hardware and software), may interface with each other or the interface 1304 (or a combination of both) over the system bus 1303 using an application programming interface (API) 1312 or a service layer 1313 (or a combination of the API 1312 and service layer 1313). The API 1312 may include specifications for routines, data structures, and object classes. The API 1312 may be either computer-language independent or dependent and refer to a complete interface, a single function, or even a set of APIs. The service layer 1313 provides software services to the computer 1302 or other components (whether or not illustrated) that are communicably coupled to the computer 1302. The functionality of the computer 1302 may be accessible for all service consumers using this service layer. Software services, such as those provided by the service layer 1313, provide reusable, defined business functionalities through a defined interface. For example, the interface may be software written in JAVA, C++, or other suitable language providing data in extensible markup language (XML) format or other suitable format. While illustrated as an integrated component of the computer 1302, alternative implementations may illustrate the API 1312 or the service layer 1313 as stand-alone components in relation to other components of the computer 1302 or other components (whether or not illustrated) that are communicably coupled to the computer 1302. Moreover, any or all parts of the API 1312 or the service layer 1313 may be implemented as child or sub-modules of another software module, enterprise application, or hardware module without departing from the scope of this disclosure.

The computer 1302 includes an interface 1304. Although illustrated as a single interface 1304 in FIG. 13, two or more interfaces 1304 may be used according to particular needs, desires, or particular implementations of the computer 1302. The interface 1304 is used by the computer 1302 for communicating with other systems in a distributed environment that are connected to the network 1330 (whether illustrated or not). Generally, the interface 1304 comprises logic encoded in software or hardware (or a combination of software and hardware) and operable to communicate with the network 1330. More specifically, the interface 1304 may comprise software supporting one or more communication protocols associated with communications such that the network 1330 or interface's hardware is operable to communicate physical signals within and outside of the illustrated computer 1302.

The computer 1302 includes a processor 1305. Although illustrated as a single processor 1305 in FIG. 13, two or more processors may be used according to particular needs, desires, or particular implementations of the computer 1302. Generally, the processor 1305 executes instructions and manipulates data to perform the operations of the computer 1302 and any algorithms, methods, functions, processes, flows, and procedures as described in the instant disclosure.

The computer 1302 also includes a memory 1306 that holds data for the computer 1302 or other components (or a combination of both) that can be connected to the network 1330 (whether illustrated or not). For example, memory 1306 can be a database storing data consistent with this disclosure. Although illustrated as a single memory 1306 in FIG. 13, two or more memories may be used according to particular needs, desires, or particular implementations of the computer 1302 and the described functionality. While memory 1306 is illustrated as an integral component of the computer 1302, in alternative implementations, memory 1306 can be external to the computer 1302.

The application 1307 is an algorithmic software engine providing functionality according to particular needs, desires, or particular implementations of the computer 1302, particularly with respect to functionality described in this disclosure. For example, application 1307 can serve as one or more components, modules, or applications. Further, although illustrated as a single application 1307, the application 1307 may be implemented as multiple applications 1307 on the computer 1302. In addition, although illustrated as integral to the computer 1302, in alternative implementations, the application 1307 can be external to the computer 1302.

There may be any number of computers 1302 associated with, or external to, a computer system containing computer 1302, each computer 1302 communicating over network 1330. Further, the term "client," "user," and other terminology may be used interchangeably as without departing from the scope of this disclosure. Moreover, this disclosure contemplates that many users may use one computer 1302, or that one user may use multiple computers 1302.

Described implementations of the subject matter can include one or more features, alone or in combination.

For example, in a first implementation, a computer-implemented method for a seismic attribute analysis of a geobody is executed by one or more processors. The method includes receiving seismic volume data regarding the geobody. An interpretation object is generated by applying a multi-Z interpretation at representative intervals of edge-detected attributes through the seismic volume data. Z-value surfaces a converted to points at each of the representative intervals. The Z-value surfaces are generated by gridding polygons having been infilled and converted from the interpretation object. A mathematical addition or subtraction is applied to generate a body of points representing the geobody by replicating the points at successive intervals. A blended 3D property model of the geobody is formed by combining the seismic volume data resampled into a 3D cellular grid and the body of points representing the geobody upscaled into the 3D cellular grid. Exploration activities are enabled by employing the seismic attribute analysis of the geobody identified based on the blended 3D property model.

The foregoing and other described implementations can each optionally include one or more of the following features.

A first feature, combinable with any of the following features, the method includes before gridding the polygons, appending the polygons together at the representative intervals.

A second feature, combinable with any of the previous or following features, the seismic attribute analysis of the geobody enhances feature of the geobody.

A third feature, combinable with any of the previous or following features, the representative intervals include successive 3D time-slices.

A fourth feature, combinable with any of the previous or following features, a single event or horizon has one or more Z-values at a same XY location on each of the Z-value surfaces.

A fifth feature, combinable with any of the previous or following features, the infilled polygons are mapped using artificial gridding algorithm at a constant z-value.

A sixth feature, combinable with any of the previous or following features, an upper extent and a lower extent of the 3D cellular grid coincides with a top and a base respectively of the geobody, and wherein an X extent and a Y extent of the 3D cellular grid are defined according to an area of interest.

A seventh feature, combinable with any of the previous or following features, the blended 3D property model is formed by employing an IF statement function applied to the seismic volume data resampled into the 3D cellular grid and the body of points representing the geobody upscaled into the 3D cellular grid.

An eighth feature, combinable with any of the previous or following features, the exploration activities include well planning and property modeling.

A ninth feature, combinable with any of the previous or following features, the exploration activities include providing spatial guidance for a horizontal well to efficiently track and drain geometrically complex hydrocarbon-bearing zones within a reservoir of the geobody.

In a second implementation, one or more non-transitory computer-readable storage media coupled to one or more processors and having instructions stored thereon which, when executed by the one or more processors, cause the one or more processors to perform operations that include receiving seismic volume data regarding the geobody. An interpretation object is generated by applying a multi-Z interpretation at representative intervals of edge-detected attributes through the seismic volume data. Z-value surfaces a converted to points at each of the representative intervals. The Z-value surfaces are generated by gridding polygons having been infilled and converted from the interpretation object. A mathematical addition or subtraction is applied to generate a body of points representing the geobody by replicating the points at successive intervals. A blended 3D property model of the geobody is formed by combining the seismic volume data resampled into a 3D cellular grid and the body of points representing the geobody upscaled into the 3D cellular grid. Exploration activities are enabled by employing the seismic attribute analysis of the geobody identified based on the blended 3D property model.

The foregoing and other described implementations can each optionally include one or more of the following features.

A first feature, combinable with any of the following features, the operations includes before gridding the polygons, appending the polygons together at the representative intervals.

A second feature, combinable with any of the previous or following features, the seismic attribute analysis of the geobody enhances feature of the geobody.

A third feature, combinable with any of the previous or following features, the representative intervals include successive 3D time-slices.

A fourth feature, combinable with any of the previous or following features, a single event or horizon has one or more Z-values at a same XY location on each of the Z-value surfaces.

A fifth feature, combinable with any of the previous or following features, the infilled polygons are mapped using artificial gridding algorithm at a constant z-value.

A sixth feature, combinable with any of the previous or following features, an upper extent and a lower extent of the 3D cellular grid coincides with a top and a base respectively of the geobody, and wherein an X extent and a Y extent of the 3D cellular grid are defined according to an area of interest.

A seventh feature, combinable with any of the previous or following features, the blended 3D property model is formed by employing an IF statement function applied to the seismic volume data resampled into the 3D cellular grid and the body of points representing the geobody upscaled into the 3D cellular grid.

An eighth feature, combinable with any of the previous or following features, the exploration activities include well planning and property modeling.

A ninth feature, combinable with any of the previous or following features, the exploration activities include providing spatial guidance for a horizontal well to efficiently track and drain geometrically complex hydrocarbon-bearing zones within a reservoir of the geobody.

In a third implementation, a computer-implemented system, comprising: one or more processors; and a computer-readable storage device coupled to the one or more processors and having instructions stored thereon which, when executed by the one or more processors, cause the one or more processors to perform operations that include receiving seismic volume data regarding the geobody. An interpretation object is generated by applying a multi-Z interpretation at representative intervals of edge-detected attributes through the seismic volume data. Z-value surfaces a converted to points at each of the representative intervals. The Z-value surfaces are generated by gridding polygons having been infilled and converted from the interpretation object. A mathematical addition or subtraction is applied to generate a body of points representing the geobody by replicating the points at successive intervals. A blended 3D property model of the geobody is formed by combining the seismic volume data resampled into a 3D cellular grid and the body of points representing the geobody upscaled into the 3D cellular grid. Exploration activities are enabled by employing the seismic attribute analysis of the geobody identified based on the blended 3D property model.

The foregoing and other described implementations can each optionally include one or more of the following features.

A first feature, combinable with any of the following features, the operations includes before gridding the polygons, appending the polygons together at the representative intervals.

A second feature, combinable with any of the previous or following features, the seismic attribute analysis of the geobody enhances feature of the geobody.

A third feature, combinable with any of the previous or following features, the representative intervals include successive 3D time-slices.

A fourth feature, combinable with any of the previous or following features, a single event or horizon has one or more Z-values at a same XY location on each of the Z-value surfaces.

A fifth feature, combinable with any of the previous or following features, the infilled polygons are mapped using artificial gridding algorithm at a constant z-value.

A sixth feature, combinable with any of the previous or following features, an upper extent and a lower extent of the 3D cellular grid coincides with a top and a base respectively of the geobody, and wherein an X extent and a Y extent of the 3D cellular grid are defined according to an area of interest.

A seventh feature, combinable with any of the previous or following features, the blended 3D property model is formed by employing an IF statement function applied to the seismic volume data resampled into the 3D cellular grid and the body of points representing the geobody upscaled into the 3D cellular grid.

An eighth feature, combinable with any of the previous or following features, the exploration activities include well planning and property modeling.

A ninth feature, combinable with any of the previous or following features, the exploration activities include providing spatial guidance for a horizontal well to efficiently track and drain geometrically complex hydrocarbon-bearing zones within a reservoir of the geobody Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data. Such devices can include, for example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other information including any parameters, variables, algorithms, instructions, rules, constraints, or references thereto. Additionally, the memory may include any other data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term graphical user interface (GUI) may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of the described geobody-interpretation system or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method for a seismic attribute analysis of a geobody executed by one or more processors, the method comprising:

receiving, though an interface, seismic volume data regarding the geobody;

generating, by one or more processors, an interpretation object by applying a multi-Z interpretation of edge-detected attributes at representative intervals through the seismic volume data, the representative intervals through the seismic volume data each including a data slice representing a different point in time for sampling seismic signals, the edge-detected attributes for a particular data slice representing edges detected for a particular point in time associated with the particular data slice, wherein the data slice of each of the representative intervals through the seismic volume data are ordered based on a respective point in time associated with each data slice;

converting, by the one or more processors, Z-value surfaces to points at the each of representative intervals through the seismic volume data based on the order of data slices, the Z-value surfaces generated by gridding polygons having been infilled and converted from the interpretation object;

applying, by the one or more processors, a mathematical addition or subtraction to generate a body of points representing the geobody by replicating the points at successive intervals through the seismic volume data in the order of the data slices;

forming, by the one or more processors, a blended 3D property model of the geobody by combining the seismic volume data resampled into a three-dimensional (3D) cellular grid and the body of points representing the geobody upscaled into the 3D cellular grid; and displaying, based on the blended 3D property model, by a user interface, a representation of the 3D geobody that is delineated in the seismic volume to enhance the 3D geobody for guiding exploration for hydrocarbons.

2. The method of claim 1, comprising:

before gridding the polygons, appending the polygons together at one or more of the representative intervals through the seismic volume data.

3. The method of claim 1, wherein the seismic attribute analysis of the geobody enhances feature of the geobody.

4. The method of claim 1, wherein the representative intervals through the seismic volume data include successive 3D time-slices.

5. The method of claim 1, wherein a single event or horizon has one or more Z-values at a same XY location on each of the Z-value surfaces.

6. The method of claim 1, wherein the infilled polygons are mapped using artificial gridding algorithm at a constant z-value.

7. The method of claim 1, wherein an upper extent and a lower extent of the 3D cellular grid coincides with a top and a base respectively of the geobody, and wherein an X extent and a Y extent of the 3D cellular grid are defined according to an area of interest.

8. The method of claim 1, wherein the blended 3D property model is formed by employing an IF statement function applied to the seismic volume data resampled into the 3D cellular grid and the body of points representing the geobody upscaled into the 3D cellular grid.

9. The method of claim 1, wherein the exploration includes well planning and property modeling.

10. The method of claim 1, wherein the exploration activities include providing spatial guidance for a horizontal well to efficiently track and drain geometrically complex hydrocarbon-bearing zones within a reservoir of the geobody.

11. One or more non-transitory computer-readable storage media coupled to one or more processors and having instructions stored thereon which, when executed by the one or more processors, cause the one or more processors to perform operations comprising:

receiving, though an interface, seismic volume data regarding the geobody;

generating, by one or more processors, an interpretation object by applying a multi-Z interpretation of edge-detected attributes at representative intervals through the seismic volume data, the representative intervals through the seismic volume data each including a data slice representing a different point in time for sampling seismic signals, the edge-detected attributes for a particular data slice representing edges detected for a particular point in time associated with the particular data slice, wherein the data slice of each of the representative intervals through the seismic volume data are ordered based on a respective point in time associated with each data slice;

converting, by the one or more processors, Z-value surfaces to points at the each of the representative intervals through the seismic volume data based on the order of data slices, the Z-value surfaces generated by gridding polygons having been infilled and converted from the interpretation object;

applying, by the one or more processors, a mathematical addition or subtraction to generate a body of points representing the geobody by replicating the points at successive intervals through the seismic volume data in the order of the data slices;

forming, by the one or more processors, a blended 3D property model of the geobody by combining the seismic volume data resampled into a three-dimensional (3D) cellular grid and the body of points representing the geobody upscaled into the 3D cellular grid; and displaying, based on the blended 3D property model, by a user interface, a representation of the 3D geobody that is delineated in the seismic volume to enhance the 3D geobody for guiding exploration for hydrocarbons.

12. The one or more non-transitory computer-readable storage media of claim 11, wherein the operations further comprise:

before gridding the polygons, appending the polygons together at one or more of the representative intervals through the seismic volume data.

13. The one or more non-transitory computer-readable storage media of claim 11, wherein the seismic attribute analysis of the geobody enhances feature of the geobody.

14. The one or more non-transitory computer-readable storage media of claim 11, wherein the representative intervals through the seismic volume data include successive 3D time-slices.

15. The one or more non-transitory computer-readable storage media of claim 11, wherein a single event or horizon has one or more Z-values at a same XY location on each of the Z-value surfaces.

16. A system, comprising:

an interface for receiving data, sending data, or both receiving and sending data;

one or more processors; and computer-readable storage device coupled to the one or more processors and having instructions stored thereon which, when executed by the one or more processors, cause the one or more processors to perform operations comprising:

receiving, though an interface, seismic volume data regarding the geobody;

generating, by one or more processors, an interpretation object by applying a multi-Z interpretation of edge-detected attributes at representative intervals through the seismic volume data, the representative intervals through the seismic volume data each including a data slice representing a different point in time for sampling seismic signals, the edge-detected attributes for a particular data slice representing edges detected for a particular point in time associated with the particular data slice, wherein the data slice of each of the representative intervals through the seismic volume data are ordered based on a respective point in time associated with each data slice;

converting, by the one or more processors, Z-value surfaces to points at the each of the representative intervals through the seismic volume data based on the order of data slices, the Z-value surfaces generated by gridding polygons having been infilled and converted from the interpretation object;

applying, by the one or more processors, a mathematical addition or subtraction to generate a body of points representing the geobody by replicating the points at successive intervals through the seismic volume data in the order of the data slices;

forming, by the one or more processors, a blended 3D property model of the geobody by combining the seismic volume data resampled into a three-dimensional (3D) cellular grid and the body of points representing the geobody upscaled into the 3D cellular grid; and displaying, based on the blended 3D property model, by a user interface, a representation of the 3D geobody that is delineated in the seismic volume to enhance the 3D geobody for guiding exploration for hydrocarbons.

17. The system of claim 16, wherein the infilled polygons are mapped using artificial gridding algorithm at a constant z-value.

18. The system of claim 16, wherein an upper extent and a lower extent of the 3D cellular grid coincides with a top and a base respectively of the geobody, and wherein an X extent and a Y extent of the 3D cellular grid are defined according to an area of interest.

19. The system of claim 16, wherein the blended 3D property model is formed by employing an IF statement function applied to the seismic volume data resampled into the 3D cellular grid and the body of points representing the geobody upscaled into the 3D cellular grid.

20. The system of claim 16, wherein the exploration includes well planning and property modeling.

\* \* \* \* \*

UNITED STATES PATENT AND TRADEMARK OFFICE
CERTIFICATE OF CORRECTION

Page 1 of 1

PATENT NO. : 10,969,507 B2
APPLICATION NO. : 16/170841
DATED : April 6, 2021
INVENTOR(S) : Andrew Mark Morton and Roger R. Sung It is certified that error appears in the above-identified patent and that said Letters Patent is hereby corrected as shown below:

In the Claims

In Column 18, Line 39, Claim 1, please replace "each of" with -- each of the --.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*